(12) United States Patent
Sun et al.

(10) Patent No.: US 9,284,449 B2
(45) Date of Patent: Mar. 15, 2016

(54) REINFORCED THERMOPLASTIC COMPOUND WITH CHEMICAL RESISTANCE

(71) Applicant: SABIC Global Technologies B.V., Bergen op Zoom (NL)

(72) Inventors: Xiaoyu Sun, Exton, PA (US); Yuanqing He, Newburgh, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 14/309,550

(22) Filed: Jun. 19, 2014

(65) Prior Publication Data

US 2015/0368458 A1    Dec. 24, 2015

(51) Int. Cl.
*C08G 64/00* (2006.01)
*C08L 67/02* (2006.01)
*C08G 63/02* (2006.01)

(52) U.S. Cl.
CPC ............. *C08L 67/02* (2013.01); *C08L 2201/08* (2013.01); *C08L 2205/035* (2013.01)

(58) Field of Classification Search
CPC ............................... C08L 63/00; C09D 163/00
USPC ......... 523/400; 528/196, 198; 525/64, 66, 67, 525/72; 524/1, 35, 41, 53, 73
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scott | |
| 4,154,775 A | 5/1979 | Axelrod | |
| 4,217,438 A | 8/1980 | Brunelle et al. | |
| 4,515,918 A | 5/1985 | Nouvertne et al. | |
| 5,648,411 A * | 7/1997 | Gallucci et al. | 524/156 |
| 7,786,246 B2 | 8/2010 | Jansen et al. | |
| 2011/0213098 A1* | 9/2011 | La Camera et al. | 525/426 |
| 2013/0298427 A1 | 11/2013 | Kaushik et al. | |
| 2014/0252265 A1* | 9/2014 | Gabriel et al. | 252/75 |

FOREIGN PATENT DOCUMENTS

| | | |
|---|---|---|
| WO | WO 2005/071012 | 8/2005 |
| WO | WO 2007/089598 | 8/2007 |

OTHER PUBLICATIONS

International Patent Application No. PCT/US2014/043453: International Search Report and Written Opinion dated Feb. 13, 2015, 11 pages.

* cited by examiner

*Primary Examiner* — Terressa Boykin

(74) *Attorney, Agent, or Firm* — Baker Hostetler LLP

(57) ABSTRACT

Disclosed herein are blended thermoplastic compositions comprising at least one polycarbonate component, at least one polybutylene component, at least one polyester ether elastomer component, at least one poly(ethylene-co-ethylacrylate) component, at least one ethylene/alkyl acrylate/glycidyl methacrylate terpolymer component, and at least one glass fiber component. The thermal blended polycarbonate compositions can optionally further comprise a transesterification quenching agent and/or epoxy hydrostabilizer agent. The resulting compositions can be used in the manufacture of articles requiring materials that have high impact strength yet have very high stiffness, while retaining desired dielectric properties and are colorable from white to black.

33 Claims, 9 Drawing Sheets

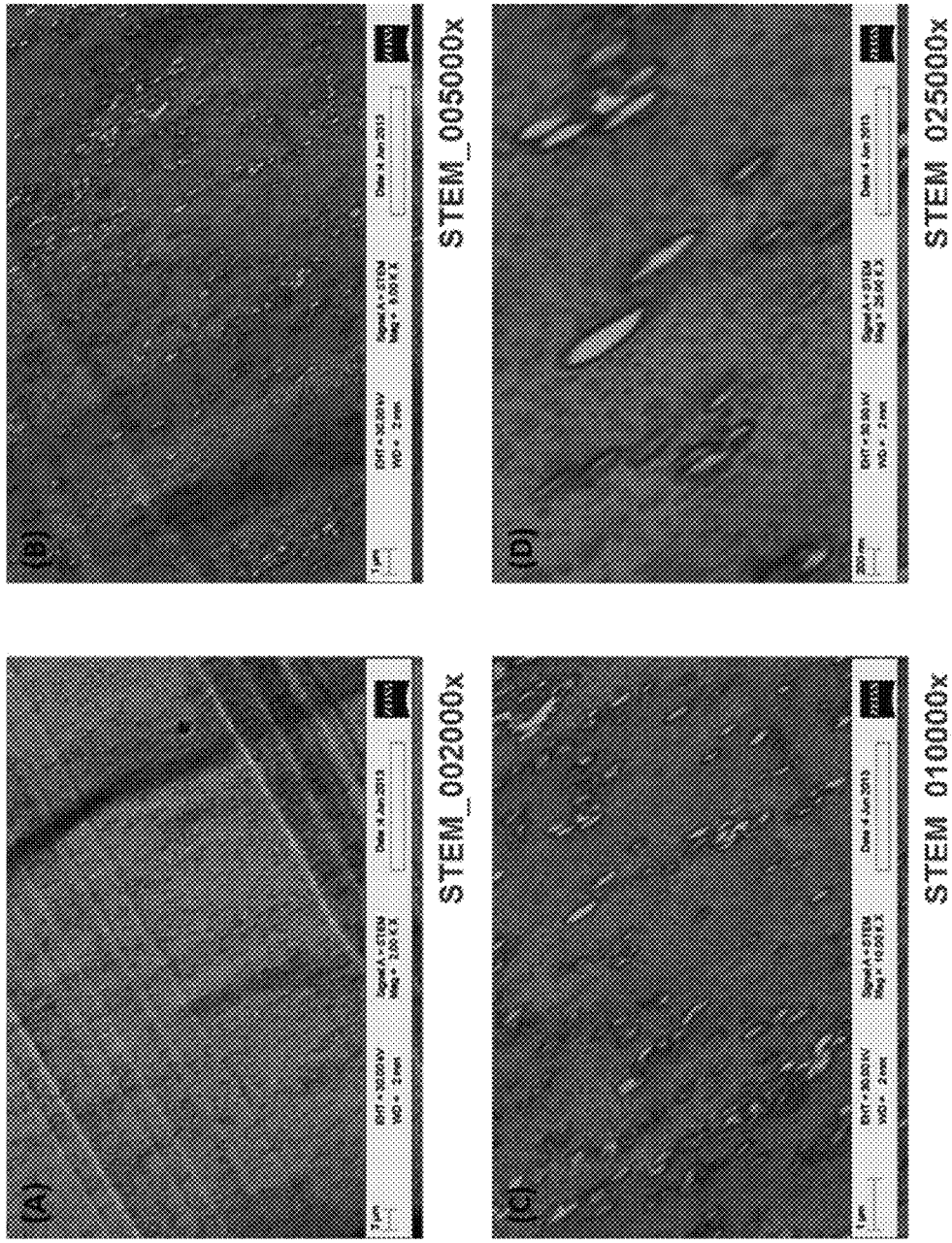
FIG. 2A-D

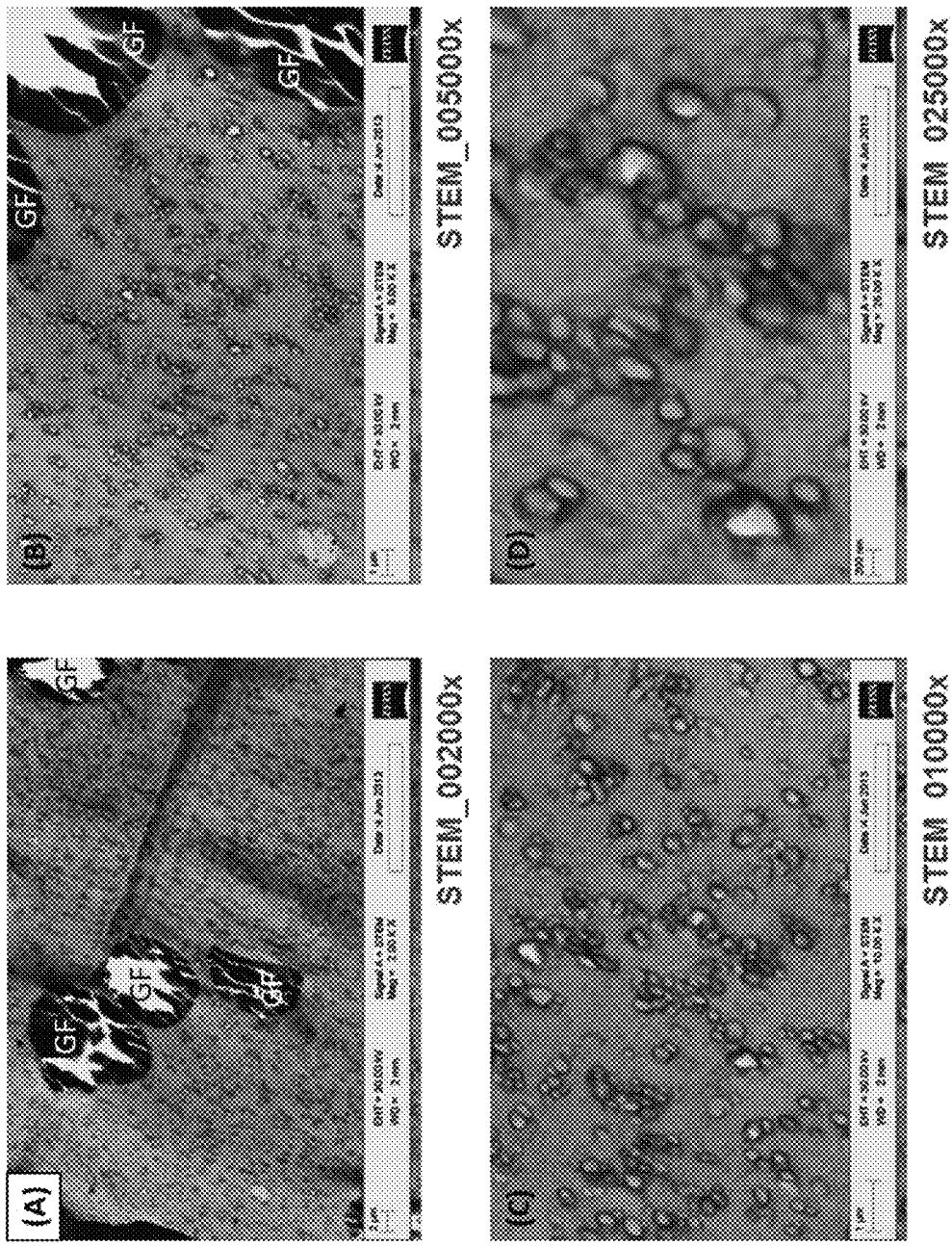
FIG. 3A-D

REINFORCED THERMOPLASTIC COMPOUND WITH CHEMICAL RESISTANCE

BACKGROUND

Many consumer oriented industries, e.g. the consumer electronics industry, have a critical need for blended thermoplastic compositions that provide very high stiffness with balanced impact resistance, are colorable from white to black, chemically resistant to everyday chemicals (and even strong acids and bases), possess excellent flow for thin wall processing, and transparent to wireless signals. In order to meet the requirements of the manufacture of desired articles in various consumer oriented industries, including the consumer electronics industry, current blended thermoplastic materials utilize use high flow crystalline resins such as polyether ether ketone polymers (PEEK) or specialty nylon with glass reinforcing fibers to provide sufficient stiffness and impact resistance. Materials containing PEEK desirably have low dielectric interference to wireless signals. However, none of these resins are colorable to white, that limits their use to structural elements that either are not visible or where visible they require a secondary over-molding to achieve appropriate aesthetics.

It would be desirable to utilize blends comprising polycarbonate (PC) and polybutylene terephthalate (PBT) in applications currently utilizing blended thermoplastic compositions with glass fiber reinforced PEEK or specialty nylon. PC/PBT blends could offer a desired balance of ductility, ultra high stiffness, low dielectric constants, and colorable in a manner to achieve desired aesthetics.

Despite significant research and development efforts, there remains a need for blended thermoplastic compositions that effectively address the appropriate balance of properties required in the consumer electronics industry, i.e. blended thermoplastic compositions that are ductile yet have very high stiffness, while retaining desired dielectric properties and are colorable from white to black.

SUMMARY

The present disclosure relates to blended thermoplastic compositions comprising at least one polycarbonate component, at least one polybutylene component, at least one polyester ether elastomer component, at least one poly(ethylene-co-ethylacrylate) component, at least one ethylene/alkyl acrylate/glycidyl methacrylate terpolymer component, and at least one glass fiber component. The resulting compositions can be used in the manufacture of articles requiring materials that have high impact strength yet have very high stiffness, while retaining desired dielectric properties.

In one aspect, the disclosure relates to blended thermoplastic compositions comprising: (a) from about 5 wt % to about 25 wt % of a polycarbonate component; (b) from about 20 wt % to about 50 wt % of a polybutylene terephthalate component; (c) from greater than about 0 wt % to about 5 wt % of a compatibilizer such as polyester ether elastomer component; (d) from greater than about 0 wt % to about 5 wt % of an impact modifier such as poly(ethylene-co-ethylacrylate) component; (e) from greater than about 0 wt % to about 3 wt % of a compatibilizer such as ethylene/alkyl acrylate/glycidyl methacrylate terpolymer component; and (f) from greater than about 0 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In various further aspects, the disclosure relates to articles comprising the disclosed compositions.

In a further aspect, the disclosure relates to methods of making the disclosed compositions.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying figures, which are incorporated in and constitute a part of this specification, illustrate several aspects and together with the description serve to explain the principles of the disclosure.

DETAILED DESCRIPTION

Figure 1:
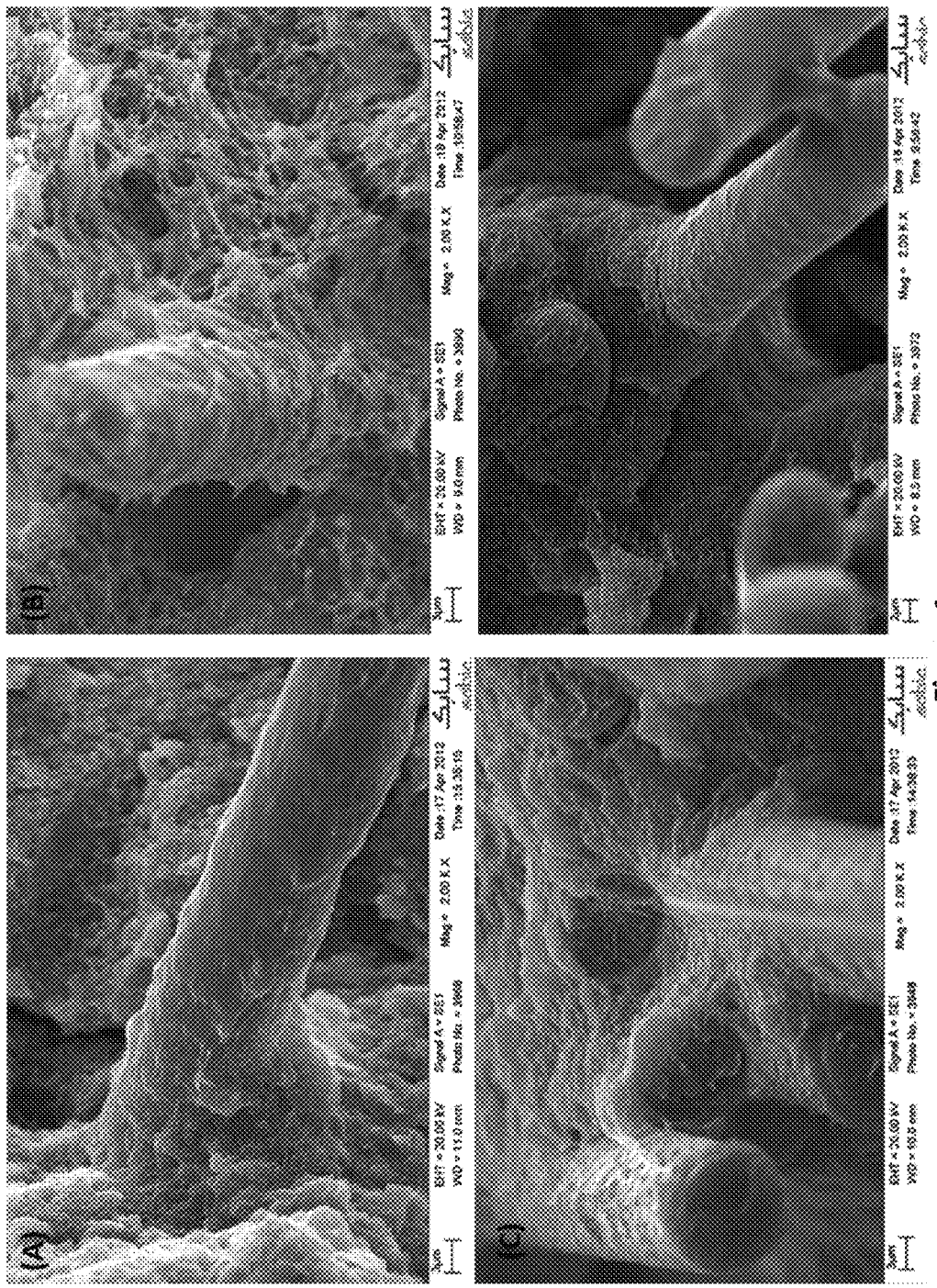
FIG. 1 shows representative micrographs obtained by scanning electron microscopy (SEM) of representative blended thermoplastic compositions of the present disclosure before and after treatment with diethylenetriamine (DETA). (Panel A) a molded part formed from formulation 9X11427 prior to DETA treatment; (Panel B) a molded part formed from formulation 9X11427 after DETA treatment for 24 hr; (Panel C) a molded part formed from formulation Example 2 prior to DETA treatment; and (Panel D) a molded part formed from formulation Example 2 after DETA treatment for 24 hr.

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DEFINITIONS

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate poly" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a glass fiber refers to an amount that is sufficient to achieve the desired improvement in the property modulated by the formulation component, e.g. achieving the desired level of stiffness, while not negatively impacting other desired properties of the blended thermoplastic composition. The specific level in terms of wt % in a composition required as an effective amount will depend upon a variety of factors including the amount and type of polycarbonate, amount and type of polycarbonate, amount and type of thermally conductive filler, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein, the term "chemically resistant" can mean resistant to can mean resitant strong acids and cosmetic chemicals. As an example, term "chemically resistant" can mean resitant to oxidizing acids at high concentrations.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

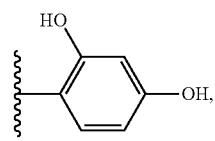 [SMILES: *c1ccc(O)cc1O]

regardless of whether 2,4-dihydroxyphenyl is used to prepare the compound. In some embodiments the radical (for example an alkyl) can be further modified (i.e., substituted alkyl) by having bonded thereto one or more "substituent radicals." The number of atoms in a given radical is not critical to the present disclosure unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$" can be used interchangeably, and refer to the statistical average molecular weight of all the polymer chains in the sample and is defined by the formula:

$$M_n = \frac{\Sigma N_i M_i}{\Sigma N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

PDI=$M_w/M_n$.

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

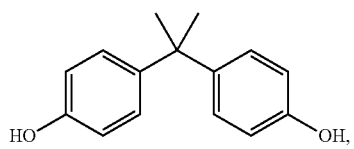 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Thermoplastic Polymer Compositions

As briefly described above, the present disclosure relates to blended thermoplastic compositions comprising at least one polycarbonate component, at least one polybutylene component, at least one polyester ether elastomer component, at least one poly(ethylene-co-ethylacrylate) component, at least one ethylene/alkyl acrylate/glycidyl methacrylate terpolymer component, and at least one glass fiber component. The resulting compositions can be used in the manufacture of articles requiring materials that have robust impact strength yet have very high stiffness, while retaining desired dielectric properties and are colorable from white to black.

In one aspect, the disclosure relates to blended thermoplastic compositions comprising: (a) from about 5 wt % to about 25 wt % of a polycarbonate component; (b) from about 20 wt % to about 50 wt % of a polybutylene terephthalate component; (c) from greater than about 0 wt % to about 5 wt % of a polyester ether elastomer component; (d) from greater than about 0 wt % to about 5 wt % of an poly(ethylene-co-ethylacrylate) component; (e) from greater than about 0 wt % to about 3 wt % of an ethylene/alkyl acrylate/glycidyl methacrylate terpolymer component; and (f) from greater than about 0 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 6 wt % to about 17 wt % of a polycarbonate component; (b) from about 25 wt % to about 55 wt % of a polybutylene terephthalate component; (c) from greater than about 1.5 wt % to about 3.5 wt % of a polyester ether elastomer component; (d) from greater than about 1.2 wt % to about 3.9 wt % of an poly (ethylene-co-ethylacrylate) component; (e) from greater than about 0.6 wt % to about 2.0 wt % of an ethylene/alkyl acrylate/glycidyl methacrylate terpolymer component; and (f) from greater than about 20 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 6 wt % to about 13 wt % of a polycarbonate component; (b) from about 25 wt % to about 45 wt % of a polybutylene terephthalate component; (b) from greater than about 1.7 wt % to about 3.2 wt % of a polyester ether elastomer component; (c) from greater than about 1.3 wt % to about 3.1 wt % of an poly(ethylene-co-ethylacrylate) component; (d) from greater than about 0.7 wt % to about 1.6 wt % of an ethylene/alkyl acrylate/glycidyl methacrylate terpolymer component; and (f) from greater than about 25 wt % to about 45 wt % of a glass fiber component; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 6 wt % to about 10 wt % of a polycarbonate component; (b) from about 25 wt % to about 35 wt % of a polybutylene terephthalate component; (c) from greater than about 1.7 wt % to about 3.2 wt % of a polyester ether elastomer component; (d) from greater than about 1.3 wt % to about 2.4 wt % of an poly(ethylene-co-ethylacrylate) component; (e) from greater than about 0.7 wt % to about 1.2 wt % of an ethylene/alkyl acrylate/glycidyl methacrylate terpolymer component; and (f) from greater than about 40 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 5 wt % to about 25 wt % of a polycarbonate component; (b) from about 20 wt % to about 50 wt % of a polybutylene terephthalate component; (c) from greater than about 0 wt % to about 5 wt % of a polyester ether elastomer component; (d) from greater than about 0 wt % to about 5 wt % of an poly(ethylene-co-ethylacrylate) component; (e) from greater than about 0 wt % to about 3 wt % of an ethylene/alkyl acrylate/glycidyl methacrylate terpolymer component; and (f) from greater than about 0 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; wherein all weight percent values are based on the total weight of the composition; wherein a molded sample of the blended thermoplastic composition has notched Izod impact strength greater than or equal to about 140 J/m when determined in accordance with ASTM D256; and wherein a molded sample of the blended thermoplastic composition has a dielectric constant less than or equal to about 4.0 when determined in accordance with ASTM D2520.

In a further aspect, the disclosure relates to blended thermoplastic compositions comprising: (a) from about 6 wt % to about 17 wt % of a polycarbonate component; (b) from about 25 wt % to about 55 wt % of a polybutylene terephthalate component; (c) from greater than about 1.5 wt % to about 3.5 wt % of a polyester ether elastomer component; (d) from greater than about 1.2 wt % to about 3.9 wt % of an poly(ethylene-co-ethylacrylate) component; (e) from greater than about 0.6 wt % to about 2.0 wt % of an ethylene/alkyl acrylate/glycidyl methacrylate terpolymer component; and (f) from greater than about 20 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; wherein all weight percent values are based on the total weight of the composition; wherein a molded sample of the blended thermoplastic composition has notched Izod impact strength greater than or equal to about 140 J/m when determined in accordance with ASTM D256; and wherein a molded sample of the blended thermoplastic composition has a dielectric constant less than or equal to about 4.0 when determined in accordance with ASTM D2520.

In a further aspect, the disclosure relates to blended thermoplastic compositions comprising: (a) from about 6 wt % to about 13 wt % of a polycarbonate component; (b) from about 25 wt % to about 45 wt % of a polybutylene terephthalate component; (c) from greater than about 1.7 wt % to about 3.2 wt % of a polyester ether elastomer component; (d) from greater than about 1.3 wt % to about 3.1 wt % of an poly(ethylene-co-ethylacrylate) component; (e) from greater than about 0.7 wt % to about 1.6 wt % of an ethylene/alkyl acrylate/glycidyl methacrylate terpolymer component; and (f) from greater than about 25 wt % to about 45 wt % of a glass fiber component; wherein the wt % ratio of the polycarbonate component to polybutylene terephthalate component is less than or equal to about 0.5; wherein the combined weight percent value of all components does not exceed about 100 wt %; wherein all weight percent values are based on the total weight of the composition; wherein a molded sample of the blended thermoplastic composition has notched Izod impact strength greater than or equal to about 140 J/m when determined in accordance with ASTM D256; and wherein a molded sample of the blended thermoplastic composition has a dielectric constant less than or equal to about 4.0 when determined in accordance with ASTM D2520.

In a further aspect, the disclosure relates to blended thermoplastic compositions comprising: (a) from about 6 wt % to about 10 wt % of a polycarbonate component; (b) from about 25 wt % to about 35 wt % of a polybutylene terephthalate component; (c) from greater than about 1.7 wt % to about 3.2 wt % of a polyester ether elastomer component; (d) from greater than about 1.3 wt % to about 2.4 wt % of an poly(ethylene-co-ethylacrylate) component; (e) from greater than about 0.7 wt % to about 1.2 wt % of an ethylene/alkyl acrylate/glycidyl methacrylate terpolymer component; and (f) from greater than about 40 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; wherein all weight percent values are based on the total weight of the composition; wherein a molded sample of the blended thermoplastic composition has notched Izod impact strength greater than or equal to about 140 J/m when determined in accordance with ASTM D256; and wherein a molded sample of the blended thermoplastic composition has a dielectric constant less than or equal to about 4.0 when determined in accordance with ASTM D2520.

In a further aspect, the disclosure relates to blended thermoplastic compositions comprising: (a) from about 5 wt % to about 25 wt % of a polycarbonate component; (b) from about 20 wt % to about 50 wt % of a polybutylene terephthalate component; (c) from greater than about 0 wt % to about 5 wt % of a polyester ether elastomer component; (d) from greater than about 0 wt % to about 5 wt % of an poly(ethylene-co-ethylacrylate) component; (e) from greater than about 0 wt % to about 3 wt % of an ethylene/alkyl acrylate/glycidyl methacrylate terpolymer component; (f) from greater than about 0 wt % to about 60 wt % of a glass fiber component; (g) from greater than about 0 wt % to about 2 wt % of a transesterification quencher; and (h) from greater than about 0 wt % to about 5 wt % of an epoxy hydrostabilizer agent; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 6 wt % to about 17 wt % of a polycarbonate component; (b) from about 25 wt % to about 55 wt % of a polybutylene terephthalate component; (c) from greater than about 1.5 wt % to about 3.5 wt % of a polyester ether elastomer component; (d) from greater than about 1.2 wt % to about 3.9 wt % of an poly(ethylene-co-ethylacrylate) component; (e) from greater than about 0.6 wt % to about 2.0 wt % of an ethylene/alkyl acrylate/glycidyl methacrylate terpolymer component; (f) from greater than about 20 wt % to about 60 wt % of a glass fiber component; (g) from greater than about 0 wt % to about 1 wt % of a transesterification quencher; and (h) from greater than about 0.5 wt % to about 3.5 wt % of an epoxy hydrostabilizer agent; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 6 wt % to about 13 wt % of a polycarbonate component; (b) from about 25 wt % to about 45 wt % of a polybutylene terephthalate component; (c) from greater than about 1.7 wt % to about 3.2 wt % of a polyester ether elastomer component; (d) from greater than about 1.3 wt % to about 3.1 wt % of an poly(ethylene-co-ethylacrylate) component; (e) from greater than about 0.7 wt % to about 1.6 wt % of an ethylene/alkyl acrylate/glycidyl methacrylate terpolymer component; (f) from greater than about 25 wt % to about 45 wt % of a glass fiber component; (g) from about 0.05 wt % to about 0.5 wt % of a transesterification quencher; and (h) from greater than about 1.0 wt % to about 2.5 wt % of an epoxy hydrostabilizer agent; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In a further aspect, the disclosure relates to blended thermoplastic compositions comprising: (a) from about 6 wt % to about 10 wt % of a polycarbonate component; (b) from about 25 wt % to about 35 wt % of a polybutylene terephthalate component; (c) from greater than about 1.7 wt % to about 3.2 wt % of a polyester ether elastomer component; (d) from greater than about 1.3 wt % to about 2.4 wt % of an poly (ethylene-co-ethylacrylate) component; (e) from greater than about 0.7 wt % to about 1.2 wt % of an ethylene/alkyl acrylate/glycidyl methacrylate terpolymer component; (f) from greater than about 40 wt % to about 60 wt % of a glass fiber component; (g) from about 0.10 wt % to about 0.25 wt % of a transesterification quencher; and (h) from greater than about 1.0 wt % to about 2.5 wt % of an epoxy hydrostabilizer agent; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

In various aspects, the disclosed blended thermoplastic compositions can optionally further comprise a transesterification agent. In various further aspects, the disclosed blended thermoplastic compositions can optionally further comprise epoxy hydrostabilizer agent.

In a further aspect, the compositions of the present disclosure further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, compositions of the present disclosure further comprise at least one additive selected from a flame retardant, a colorant, a primary anti-oxidant, and a secondary anti-oxidant.

In various aspects, the blended thermoplastic compositions of the present disclosure have particular properties and characteristics. In a further aspect, a molded sample of the blended thermoplastic composition has notched Izod impact strength greater than or equal to about 140 J/m when determined in accordance with ASTM D256. In a still further aspect, a molded sample of the blended thermoplastic composition has notched Izod impact strength greater than or equal to about 150 J/m when determined in accordance with ASTM D256.

In a further aspect, a molded sample of the blended thermoplastic composition has a dielectric constant less than or equal to about 4.0 when determined in accordance with ASTM D2520. In a still further aspect, a molded sample of the blended thermoplastic composition has a dielectric constant less than or equal to about 3.8 when determined in accordance with ASTM D2520.

Polycarbonate Polymer Component

In one aspect, the disclosed blended thermoplastic compositions comprise a polycarbonate polymer composition wherein the polycarbonate polymer comprising bisphenol A, a polycarbonate copolymer, polyester carbonate polymer, or polycarbonate-polysiloxane copolymer, or combinations thereof.

In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions have repeating structural units of the formula (1):

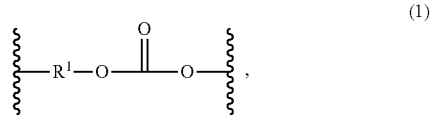

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$—A^1—Y^1—A^2—, \quad (2)$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In a further aspect, polycarbonates can be produced by the interfacial reaction of dihydroxy compounds having the formula HO—$R^1$—OH, which includes dihydroxy compounds of formula (3):

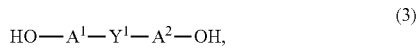

$$HO—A^1—Y^1—A^2—OH, \quad (3)$$

wherein $Y^1$, $A^1$ and $A^2$ are as described above. Also included are bisphenol compounds of general formula (4):

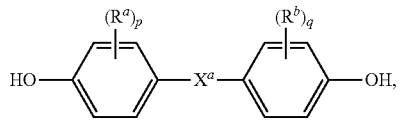

wherein $R^a$ and $R^b$ each represent a halogen atom or a monovalent hydrocarbon group and can be the same or different; p and q are each independently integers from 0 to 4; and $X^a$ represents one of the groups of formula (5):

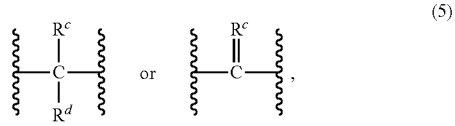

wherein $R^c$ and $R^d$ each independently represent a hydrogen atom or a monovalent linear or cyclic hydrocarbon group and $R^e$ is a divalent hydrocarbon group.

In various aspects, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group can have 3 to 20 atoms, and can be a single saturated or unsaturated ring, or fused polycyclic ring system wherein the fused rings are saturated, unsaturated, or aromatic.

In various aspects, examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis-(4-hydroxyphenyl)phthalimidine (PPPBP), and the like, as well as mixtures including at least one of the foregoing dihydroxy compounds.

In a further aspect, examples of the types of bisphenol compounds that can be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, and 1,1-bis(4-hydroxy-t-butylphenyl)propane. Combinations including at least one of the foregoing dihydroxy compounds can also be used. In various further aspects, bisphenols containing substituted or unsubstituted cyclohexane units can be used, for example bisphenols of formula (6):

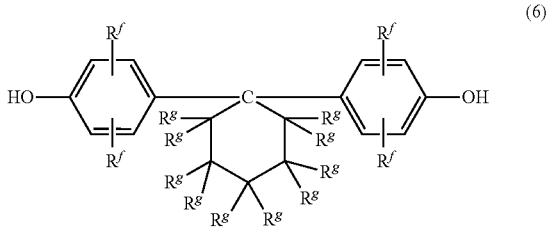

(6)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

In further aspects, additional useful dihydroxy compounds are those compounds having the formula HO—$R^1$—OH include aromatic dihydroxy compounds of formula (7):

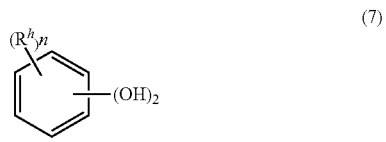

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In addition to the polycarbonates described above, combinations of the polycarbonate with other thermoplastic polymers, for example combinations of homopolycarbonates and/or polycarbonate copolymers, can be used.

In various aspects, a polycarbonate can employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates can be prepared by adding a branching agent during polymerization.

In a further aspect, the branching agents include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In a further aspect, the polycarbonate can be a linear homopolymer derived from bisphenol A, in which each of $A^1$ and $A^2$ is p-phenylene and $Y^1$ is isopropylidene. The polycarbonates generally can have an intrinsic viscosity, as determined in chloroform at 25° C., of 0.3 to 1.5 deciliters per gram (dl/g), specifically 0.45 to 1.0 dl/g. The polycarbonates can have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards. In a yet further aspect, the polycarbonate component has an Mw of about 15,000 to about 55,000. In an even further aspect, the polycarbonate component has an Mw of about 18,000 to about 40,000.

In a further aspect, a polycarbonate component used in the formulations of the present disclosure can have a melt volume flow rate (often abbreviated MVR) measures the rate of extrusion of a thermoplastics through an orifice at a prescribed temperature and load. Polycarbonates useful for the formation of articles can have an MVR, measured at 300° C. under a load of 1.2 kg according to ASTM D1238-04 or ISO 1133, of 0.5 to 80 cubic centimeters per 10 minutes (cc/10 min). In a still further aspect, the polycarbonate component comprises a two polycarbonate polymers wherein one of the polycarbonate polymers is a poly(aliphatic ester)-polycarbonate. In cases where the polycarbonate components comprises a non-poly(aliphatic ester)-polycarbonate and a poly(aliphatic ester)-polycarbonate, the non-poly(aliphatic ester)-polycarbonate (or a combination of such polycarbonates) can have a MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

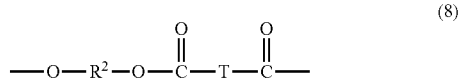

(8)

wherein $R^2$ is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and can be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group. $R^2$ can be is a $C_{2-30}$ alkylene group having a straight chain, branched chain, or cyclic (including polycyclic) structure. Alternatively, $R^2$ can be derived from an aromatic dihydroxy compound of formula (4) above, or from an aromatic dihydroxy compound of formula (7) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Examples of specific dicarboxylic acids are terephthalic acid, isophthalic acid, naphthalene dicarboxylic acid, cyclohexane dicarboxylic acid, or combinations thereof. In various aspects, an example of a specific dicarboxylic acid comprises a combination of isophthalic acid and terephthalic acid wherein the weight ratio of isophthalic acid to terephthalic acid is about 91:9 to about 2:98. In another aspect, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a further aspect, the thermoplastic composition comprises a polyester-polycarbonate copolymer, and specifically a polyester-polycarbonate copolymer in which the ester units of formula (8) comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group comprising methylene ($—CH_2—$) repeating units. In a yet further aspect, a useful soft block ester unit comprises units of formula (8a):

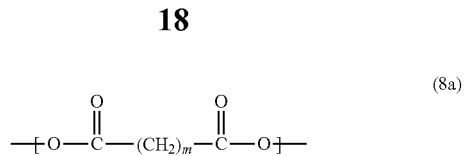

(8a)

wherein m is 4 to 18. In a further aspect of formula (8a), m is 8 to 10. The poly(aliphatic ester)-polycarbonate can include less than or equal to 25 wt % of the soft block unit. In a still further aspect, a poly(aliphatic ester)-polycarbonate comprises units of formula (8a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (8b):

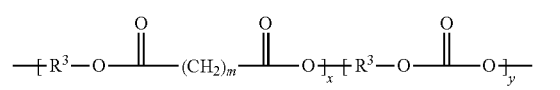

(8b)

where each $R^3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a further aspect, the soft block ester units can be derived from an alpha, omega $C_{10-12}$ aliphatic dicarboxylic acid or a reactive derivative thereof. In a still further aspect, the carboxylate portion of the aliphatic ester unit of formula (8a), in which the terminal carboxylate groups are connected by a chain of repeating methylene ($—CH_2—$) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation can be used. In various further aspects, the poly(aliphatic ester)-polycarbonate having soft block ester units comprising a straight chain methylene group and a bisphenol A polycarbonate group is shown in formula (8c):

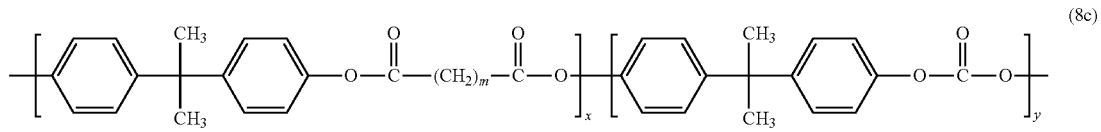

(8c)

where m is 4 to 18 and x and y are as defined for formula (8b). In a specific exemplary aspect, a useful poly(aliphatic ester)-polycarbonate copolymer comprises sebacic acid ester units and bisphenol A carbonate units (formula (8c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In one aspect, polycarbonates, including polyester-polycarbonates, can be manufactured by processes such as interfacial polymerization and melt polymerization.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate ($HS^-$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including a polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

Polycarbonates, including polyester-polycarbonates, can be also be manufactured by interfacial polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary aspect, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be about 0.1 to about 10 wt % based on the weight of bisphenol in the phosgenation mixture. In another aspect, an effective amount of phase transfer catalyst can be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, monocarboxylic acid chlorides, and/or monochloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Specifically, polyester-polycarbonates, including poly(aliphatic ester)-polycarbonates, can be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly (arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

In an aspect, where the melt volume rate of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate can be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In a further aspect, the redistribution-catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific aspect, a useful redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide.

In a further aspect, the redistribution catalyst is present in an amount of 40 to 120 ppm, specifically 40 to 110 ppm, and more specifically 40 to 100 ppm, by weight based on the weight of the poly(aliphatic ester)-polycarbonate.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (9):

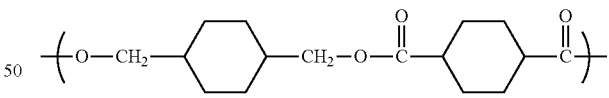

(9)

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyester-polycarbonate copolymers generally can have a weight average molecular weight (Mw) of 1,500 to 100,000 g/mol, specifically 1,700 to 50,000 g/mol. In an aspect, poly (aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

A polyester-polycarbonate can in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04 or ISO 1133. Commercial polyester-polycarbonates are marketed under the trade name LEXAN® SLX polymers, including for example LEXAN® SLX-9000, and are available from SABIC Innovative Plastics (formerly GE Plastics).

In an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 6 minutes, according to ASTM D1238-04. Also in an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 4 minutes, according to ISO 1133.

In an aspect, the thermoplastic composition comprises poly(aliphatic ester)-polycarbonate in an amount of 50 to 100 wt %, based on the total weight of poly(aliphatic ester)-polycarbonate and any added polycarbonate. In a specific aspect, the thermoplastic composition comprises only poly (aliphatic ester)-polycarbonate. In another specific aspect, the thermoplastic comprises poly(aliphatic ester)-polycarbonate that has been reactively extruded to form a reaction product. In another specific aspect, the thermoplastic comprises a blend of poly(aliphatic ester)-polycarbonate that has been reactively extruded.

In a further aspect, the polycarbonate polymer is a homopolymer. In a still further aspect, the homopolymer comprises repeating units derived from bisphenol A.

In a further aspect, the polycarbonate component is a copolymer. In a still further aspect, the copolymer comprises repeating units derived from BPA. In yet a further aspect, the copolymer comprises repeating units derived from sebacic acid. In an even further aspect, the copolymer comprises repeating units derived from sebacic acid and BPA. Useful polycarbonate copolymers are commercially available and include, but are not limited to, those marketed under the trade names LEXAN® EXL and LEXAN® HFD polymers, and are available from SABIC Innovative Plastics (formerly GE Plastics).

In various aspects, the blended thermoplastic compositions of the present disclosure comprise a polycarbonate component present in an amount from about 5 wt % to about 25 wt %. In a further aspect, the polycarbonate component is present in an amount from about 6 wt % to about 20 wt %. In a still further aspect, the polycarbonate component is present in an amount from about 6 wt % to about 17 wt %. In a yet further aspect, the polycarbonate component is present in an amount from about 6 wt % to about 13 wt %. In an even further aspect, the polycarbonate component is present in an amount from about 6 wt % to about 10 wt %.

In a further aspect, the polycarbonate component has a weight average molecular weight from about 15,000 to about 50,000 grams/mole, as measured by gel permeation chromatography using BPA polycarbonate standards. In a still further aspect, the polycarbonate component has a weight average molecular weight from about 15,000 to about 40,000 grams/mole, as measured by gel permeation chromatography using BPA polycarbonate standards. In a yet further aspect, the polycarbonate component has a weight average molecular weight from about 15,000 to about 30,000 grams/mole, as measured by gel permeation chromatography using BPA polycarbonate standards. In an even further aspect, the polycarbonate component has a weight average molecular weight from about 15,000 to about 25,000 grams/mole, as measured by gel permeation chromatography using BPA polycarbonate standards. In a still further aspect, the polycarbonate component has a weight average molecular weight from about 15,000 to about 23,000 grams/mole, as measured by gel permeation chromatography using BPA polycarbonate standards.

In a further aspect, the polycarbonate component has a weight average molecular weight from about 18,000 to about 50,000 grams/mole, as measured by gel permeation chromatography using BPA polycarbonate standards. In a still further aspect, the polycarbonate component has a weight average molecular weight from about 18,000 to about 40,000 grams/mole, as measured by gel permeation chromatography using BPA polycarbonate standards. In a yet further aspect, the polycarbonate component has a weight average molecular weight from about 18,000 to about 30,000 grams/mole, as measured by gel permeation chromatography using BPA polycarbonate standards. In an even further aspect, the polycarbonate component has a weight average molecular weight from about 18,000 to about 25,000 grams/mole, as measured by gel permeation chromatography using BPA polycarbonate standards. In a still further aspect, the polycarbonate component has a weight average molecular weight from about 18,000 to about 23,000 grams/mole, as measured by gel permeation chromatography using BPA polycarbonate standards.

In various aspects, the polycarbonate component has a melt volume flow rate (MVR) from about 17 grams/10 minutes to about 32 grams/10 minutes when measured at 300° C. and under a load of 1.2 kg according to ASTM D1238. In a still further aspect, the polycarbonate component has a melt volume flow rate (MVR) from about 20 grams/10 minutes to about 30 grams/10 minutes when measured at 300° C. and under a load of 1.2 kg according to ASTM D1238. In a yet further aspect, the polycarbonate component has a melt volume flow rate (MVR) from about 22 grams/10 minutes to about 29 grams/10 minutes when measured at 300° C. and under a load of 1.2 kg according to ASTM D1238.

In a further aspect, the polycarbonate component comprises a first polycarbonate component and a second polycarbonate component.

In a further aspect, the first polycarbonate component is a high flow polycarbonate. In a still further aspect, the first polycarbonate component has a melt volume flow rate (MVR) from about 17 grams/10 minutes to about 50 grams/ 10 minutes when measured at 300° C. and under a load of 1.2 kg according to ASTM D1238. In yet a further aspect, the first polycarbonate component has a melt volume flow rate (MVR) from about 20 grams/10 minutes to about 45 grams/10 minutes when measured at 300° C. and under a load of 1.2 kg according to ASTM D1238. In an even further aspect, the first polycarbonate component has a melt volume flow rate (MVR) from about 22 grams/10 minutes to about 40 grams/10 minutes when measured at 300° C. and under a load of 1.2 kg according to ASTM D1238.

In a further aspect, the first polycarbonate component has a weight average molecular weight from about 18,000 to about 40,000 grams/mole, as measured by gel permeation chromatography using BPA polycarbonate standards. In a still further aspect, the first polycarbonate component has a weight average molecular weight from about 18,000 to about 30,000 grams/mole, as measured by gel permeation chromatography using BPA polycarbonate standards. In yet a further aspect, the first polycarbonate component has a weight average molecular weight from about 18,000 to about 25,000 grams/mole, as measured by gel permeation chromatography using BPA polycarbonate standards. In an even further aspect, the first polycarbonate component has a weight average molecular weight from about 18,000 to about 25,000 grams/mole, as measured by gel permeation chromatography using BPA polycarbonate standards.

In a further aspect, the second polycarbonate component is a low flow polycarbonate. In a still further aspect, the second polycarbonate component has a melt volume flow rate (MVR) from about 1.0 gram/10 minutes to about 8.0 grams/10 minutes when measured at 300° C. and under a load of 1.2 kg according to ASTM D1238. In yet a further aspect, the second polycarbonate component has a melt volume flow rate (MVR) from about 1 gram/10 minutes to about 7.2 grams/10 minutes when measured at 300° C. and under a load of 1.2 kg according to ASTM D1238. In an even further aspect, the second polycarbonate component has a melt volume flow rate (MVR) from about 1 gram/10 minutes to about 7.1 grams/10 minutes when measured at 300° C. and under a load of 1.2 kg according to ASTM D1238.

In a further aspect, the second polycarbonate component has a weight average molecular weight from about 18,000 to about 40,000 grams/mole, as measured by gel permeation chromatography using BPA polycarbonate standards. In a still further aspect, the second polycarbonate component has a weight average molecular weight from about 20,000 to about 35,000 grams/mole, as measured by gel permeation chromatography using BPA polycarbonate standards. In yet a further aspect, the second polycarbonate component has a weight average molecular weight from about 20,000 to about 30,000 grams/mole, as measured by gel permeation chromatography using BPA polycarbonate standards. In an even further aspect, the second polycarbonate component has a weight average molecular weight from about 23,000 to about 30,000 grams/mole, as measured by gel permeation chromatography using BPA polycarbonate standards. In a still further aspect, the second polycarbonate component has a weight average molecular weight from about 25,000 to about 30,000 grams/mole, as measured by gel permeation chromatography using BPA polycarbonate standards. In yet a further aspect, the second polycarbonate component has a weight average molecular weight from about 27,000 to about 30,000 grams/mole, as measured by gel permeation chromatography using BPA polycarbonate standards.

Polybutylene Terephthalate Component

In one aspect, the disclosed blended thermoplastic compositions comprise a polybutylene terephthalate component. As used herein, polybutylene terephthalate can be used interchangeably with poly(1,4-butylene terephthalate). Polybutylene terephthalate is one type of polyester. Polyesters, which include poly(alkylene dicarboxylates), liquid crystalline polyesters, and polyester copolymers, can be useful in the disclosed thermoplastic compositions of the present disclosure. In general, polyesters, as described herein, including polybutylene terephthalate, are highly miscible with the polycarbonates when blended.

Polyesters having repeating units of formula (A):

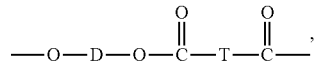

wherein T is a residue derived from a terephthalic acid or chemical equivalent thereof, and D is a residue derived from polymerization of an ethylene glycol, butylene diol, specifically 1,4-butane diol, or chemical equivalent thereof. Chemical equivalents of diacids include dialkyl esters, e.g., dimethyl esters, diaryl esters, anhydrides, salts, acid chlorides, acid bromides, and the like. Chemical equivalents of ethylene diol and butylene diol include esters, such as dialkylesters, diaryl esters, and the like.

In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions.

In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions.

Examples of aromatic dicarboxylic acids include 1,4-naphthalenedicarboxylic acid, 1,5-naphthalenedicarboxylic acid, 2,6-naphthalenedicarboxylic acid, and combinations comprising at least one of the foregoing dicarboxylic acids. Exemplary cycloaliphatic dicarboxylic acids include norbornene dicarboxylic acids, 1,4-cyclohexanedicarboxylic acids, and the like. In a specific embodiment, T is derived from a combination of terephthalic acid and isophthalic acid wherein the weight ratio of terephthalic acid to isophthalic acid is 99:1 to 10:90, specifically 55:1 to 50:50.

Examples of C6-C12 aromatic diols include, but are not limited to, resorcinol, hydroquinone, and pyrocatechol, as well as diols such as 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, and the like, and combinations comprising at least one of the foregoing aromatic diols.

Exemplary C2-C12 aliphatic diols include, but are not limited to, straight chain, branched, or cycloaliphatic alkane diols such as propylene glycol, i.e., 1,2- and 1,3-propylene glycol, 2,2-dimethyl-1,3-propane diol, 2-ethyl-2-methyl-1,3-propane diol, 1,4-but-2-ene diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol; and combinations comprising at least of the foregoing diols.

Polyesters can also include aromatic polyesters, poly(alkylene esters) including poly(alkylene arylates), and poly(cycloalkylene diesters). Aromatic polyesters can have a polyester structure according to formula (A), wherein D and T are each aromatic groups as described hereinabove. In an aspect, useful aromatic polyesters can include, for example, poly(isophthalate-terephthalate-resorcinol)esters, poly(isophthalate-terephthalate-bisphenol A) esters, poly[(isophthalate-terephthalate-resorcinol)ester-co-(isophthalate-terephthalate-bisphenol A)] ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) can have a polyester structure according to formula (A), wherein T comprises groups derived from aromatic dicarboxylates, cycloaliphatic dicarboxylic acids, or derivatives thereof.

Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene.

Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (B):

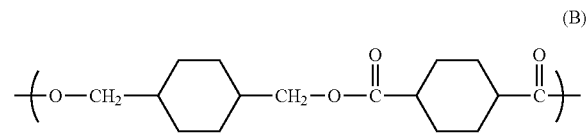

(B)

wherein, as described using formula (A), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

Polyesters, including the polybutylene terephthalate component, can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $Ti(OC_4H_9)$, in n-butanol.

It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In various aspects, the polybutylene terephthalate component has an intrinsic viscosity (as measured in phenol/tetrachloroethane (60:40, volume/volume ratio) at 25° C.) ranging from at least about 0.4 to about 2.0 deciliters per gram. In a further aspect, the polybutylene terephthalate component has an intrinsic viscosity (as measured in chloroform at 25° C.) ranging from at least about 0.45 to about 1.2 deciliters per gram.

In a further aspect, the polybutylene terephthalate component has a weight average molecular weight from about 5,000 to about 130,000 g/mol as determined by gel permeation chromatography in chloroform/hexafluoroisopropanol (5:95, volume/volume ratio) at 25° C. using polystyrene standards. In a still further aspect, the polybutylene terephthalate component has a weight average molecular weight from about 10,000 to about 200,000 g/mol as determined by gel permeation chromatography in chloroform/hexafluoroisopropanol (5:95, volume/volume ratio) at 25° C. using polystyrene standards. In a yet further aspect, the polybutylene terephthalate component has a weight average molecular weight from about 30,000 to about 200,000 g/mol as determined by gel permeation chromatography in chloroform/hexafluoroisopropanol (5:95, volume/volume ratio) at 25° C. using polystyrene standards. In an even further aspect, the polybutylene terephthalate component has a weight average molecular weight from about 50,000 to about 200,000 g/mol as determined by gel permeation chromatography in chloroform/hexafluoroisopropanol (5:95, volume/volume ratio) at 25° C. using polystyrene standards. In a still further aspect, the polybutylene terephthalate component has a weight average molecular weight from about 60,000 to about 200,000 g/mol as determined by gel permeation chromatography in chloroform/hexafluoroisopropanol (5:95, volume/volume ratio) at 25° C. using polystyrene standards.

A mixture of polyester resins with differing viscosities can be used to make a blend of two or more polybutylene terephthalates to allow for control of viscosity of the final blended thermoplastic composition.

In a further aspect, the polybutylene terephthalate component is present in an amount from about 20 wt % to about 50 wt %. In a still further aspect, the polybutylene terephthalate component is present in an amount from about 25 wt % to about 50 wt %. In a yet further aspect, the polybutylene terephthalate component is present in an amount from about 28 wt % to about 48 wt %. In an even further aspect, the polybutylene terephthalate component is present in an amount from about 28 wt % to about 42 wt %. In a still further aspect, the polybutylene terephthalate component is present in an amount from about 28 wt % to about 35 wt %.

In a further aspect, the polybutylene terephthalate component has an intrinsic viscosity from about 0.50 to about 0.80.

Polyester Ether Elastomer Component

In an aspect, the a compatibilizer such as polyester ether elastomer component is present in an amount from greater than about 0 wt % to about 5 wt %. In a still further aspect, the polyester ether elastomer component is present in an amount from about 1 wt % to about 5 wt %. In a yet further aspect, the polyester ether elastomer component is present in an amount from about 1.5 wt % to about 4.0 wt %. In an even further aspect, the polyester ether elastomer component is present in an amount from about 1.5 wt % to about 3.5 wt %. In a still further aspect, the polyester ether elastomer component is present in an amount from about 1 wt % to about 5 wt %.

Poly(Ethylene-Co-Ethylacrylate) Component

In a further aspect, an acrylic impact modifier such as a poly(ethylene-co-ethylacrylate) component is present in an amount from greater than about 0 wt % to about 5 wt %. In a still further aspect, the poly(ethylene-co-ethylacrylate) component is present in an amount from about 1 wt % to about 5 wt %. In a yet further aspect, the poly(ethylene-co-ethylacrylate) component is present in an amount from about 1 wt % to about 4 wt %. In an even further aspect, the poly(ethylene-co-ethylacrylate) component is present in an amount from about 1.2 wt % to about 3.9 wt %. In a still further aspect, the poly(ethylene-co-ethylacrylate) component is present in an amount from about 1.3 wt % to about 3.1 wt %. In a yet further aspect, the poly(ethylene-co-ethylacrylate) component is present in an amount from about 1.3 wt % to about 2.4 wt %.

Ethylene/Alkyl Acrylate/Glycidyl Methacrylate Terpolymer Component

In a further aspect, a compatibilizer for PC/PBT such as ethylene/alkyl acrylate/glycidyl methacrylate terpolymer component is present in an amount from greater than about 0 wt % to about 3 wt %. In a still further aspect, the ethylene/alkyl acrylate/glycidyl methacrylate terpolymer component is present in an amount from about 0.5 wt % to about 3.0 wt %. In a yet further aspect, the ethylene/alkyl acrylate/glycidyl methacrylate terpolymer component is present in an amount from about 0.5 wt % to about 2.0 wt %. In an even further aspect, the ethylene/alkyl acrylate/glycidyl methacrylate terpolymer component is present in an amount from about 0.7 wt % to about 1.6 wt %. In a still further aspect, the ethylene/alkyl acrylate/glycidyl methacrylate terpolymer component is present in an amount from about 0.7 wt % to about 1.2 wt %.

Transesterification Quenching Agent

In various aspects, the blended thermoplastic compositions of the present disclosure further comprise a transesterification quenching agent. In a further aspect, the transesterification quenching agent is a phosphorus-containing stabilizer. In a still further aspect, the transesterification quenching agent comprises a phosphorus-containing stabilizer. In a yet further aspect, the transesterification quenching agent is an acidic phosphate salts, e.g. a monozinc phosphate, sodium dihydrogen phosphate, potassium hydrogen phosphate, calcium hydrogen phosphate, sodium acid pyrophosphate and mixtures thereof. In an even further aspect, the transesterification quenching agent comprises a phosphite compounds, e.g. a phosphite compound of the general formula P—(OR')$_3$ wherein each R' is the same or different and independently represents hydrogen, alkyl groups, aryl groups or any mixture thereof provided that at least one of the R' groups is hydrogen or alkyl. Illustratively, these include, but are not limited to, diphenylisodecyl phosphite, diisooctyl phosphite, dilauryl phosphite, diphenyl phosphite, phenyl diisodecyl phosphite, ethyl hexyl diphenyl phosphite, stearyl phosphite and mixtures thereof. In a still further aspect, the transesterification quenching agent comprises a Group IB or Group IIB phosphate salt such as zinc phosphate. In a further aspect, the transesterification quenching agent comprises a phosphorous oxo-acid such as phosphorous acid, phosphoric acid, polyphosphoric acid, or hypophosphorous acid.

In a further aspect, the phosphorus-containing stabilizer is selected from zinc phosphate, diphenylisodecyl phosphite, monosodium phosphate and sodium acid pyrophosphate and mixtures thereof. In a still further aspect, the phosphorus-containing stabilizer is zinc phosphate.

In a further aspect, the transesterification quenching agent is selected from an acidic phosphate salt, a Group IB phosphate salt, a Group IIB phosphate salt, a phosphorus oxo-acid, and mixtures thereof. In a still further aspect, the transesterification quenching agent is an acidic phosphate salt. In a yet further aspect, the transesterification quenching agent is selected from a Group IB phosphate salt and a Group IIB phosphate salt. In an even further aspect, the transesterification quenching agent is mono zinc phosphate. In a still further aspect, the transesterification quenching agent is a phosphorus oxo-acid.

In a further aspect, the transesterification quenching agent is present in an amount from greater than about 0 wt % to about 1 wt %. In a still further aspect, the transesterification quenching agent is present in an amount from greater than about 0.05 wt % to about 0.50 wt %. In a yet further aspect, the transesterification quenching agent is present in an amount from greater than about 0.10 wt % to about 0.25 wt %.

Epoxy Hydrostabilizer Agent

In one aspect, the blended thermoplastic compositions of the present disclosure can optionally further comprise an epoxy hydrostabilizer agent. In a further aspect, the epoxy hydrostabilizer agent is an oligomeric epoxide. In a still further aspect, the oligomeric epoxide is a bisphenol A epoxide oligomer. In a yet further aspect, the Bisphenol A epoxide oligomer is a bisphenol A diglycidyl ether.

For example, the epoxy hydrostabilizer agent can be an epoxy resin formed from reacting epichlorohydrin with bisphenol A to form diglycidyl ethers of bisphenol A. The simplest resin of this class is formed from reacting two moles of epichlorohydrin with one mole of bisphenol A to form the bisphenol A diglycidyl ether (commonly abbreviated to DGEBA or BADGE). DGEBA resins are transparent colorless-to-pale-yellow liquids at room temperature, with viscosity typically in the range of 5-15 P·s at 25° C. Industrial grades normally contain some distribution of molecular weight, since pure DGEBA shows a strong tendency to form a crystalline solid upon storage at ambient temperature.

Exemplary epoxy hydrostabilizer agents useful in the blended thermoplastic compositions of the present disclosure are commercially available under the trade names EPON™ 1001, EPON™ 1002, EPON™ 1004, EPON™ 1007, and EPON™ 1009 (all available from Momentive Performance Materials Holdings, LLC); GT 6063, GT 6084, and GT 6097 (all available from Vantico); DER 661 and DER 662 (available from Dow Chemical); and Epiclon 1050, Epiclon 2050, Epiclon 3050, Epiclon 4050, and Epiclon 7050 (all available from DIC International (USA), LLC).

In a further aspect, the epoxy hydrostabilizer agent of the present is a low viscosity, low molecular weight material. In a still further aspect, the epoxy hydrostabilizer agent has a weight average molecular weight of less than or about 5,000 g/mol when determined by gel permeation chromatography using polystyrene standards. In a yet further aspect, the epoxy hydrostabilizer agent has a weight average molecular weight of less than or about 2,000 g/mol when determined by gel permeation chromatography using polystyrene standards. In an even further aspect, the epoxy hydrostabilizer agent has a weight average molecular weight of less than or about 1,500 g/mol when determined by gel permeation chromatography using polystyrene standards. In a still further aspect, the epoxy hydrostabilizer agent has a weight average molecular weight of less than or about 1,000 g/mol when determined by gel permeation chromatography using polystyrene standards.

In a further aspect, the epoxy hydrostabilizer agent has an epoxide equivalent weight from about 400 g/eq to about 2000 g/eq. In a still further aspect, the epoxy hydrostabilizer agent has an epoxide equivalent weight from about 400 g/eq to about 1000 g/eq.

In a further aspect, the epoxy hydrostabilizer agent is present in an amount from greater than about 0 wt % to about 5 wt %. In a still further aspect, the epoxy hydrostabilizer agent is present in an amount from greater than about 0.5 wt % to about 3.5 wt %. In a yet further aspect, the epoxy hydrostabilizer agent is present in an amount from greater than about 1.0 wt % to about 2.5 wt %.

Glass Fiber Component

In one aspect, the disclosed blended thermoplastic compositions comprise a glass fiber component. In a further aspect, the glass fiber used is selected from E-glass, S-glass, AR-glass, T-glass, D-glass and R-glass. In a still further aspect, the glass fiber used is selected from E-glass, S-glass, and combinations thereof. In a still further aspect, the glass fiber is one or more S-glass materials. High-strength glass is generally known as S-type glass in the United States, R-glass in Europe and T-glass in Japan. S-glass was originally developed for military applications in the 1960s, and a lower cost version, S-2 glass, was later developed for commercial applications. High-strength glass has appreciably higher amounts of silica oxide, aluminum oxide and magnesium oxide than E-glass. S-2 glass is approximately 40-70% stronger than E-glass. The glass fibers can be made by standard processes, e.g., by steam or air blowing, flame blowing, and mechanical pulling. Exemplary glass fibers for polycarbonate reinforcement are made by mechanical pulling.

The glass fibers may be sized or unsized. Sized glass fibers are coated on their surfaces with a sizing composition selected for compatibility with the polycarbonate. The sizing composition facilitates wet-out and wet-through of the polycarbonate upon the fiber strands and assists in attaining desired physical properties in the polycarbonate composition.

In various further aspects, the glass fiber is sized with a coating agent. In a further aspect, the coating agent is present in an amount from about 0.1 wt % to about 5 wt % based on the weight of the glass fibers. In a still further aspect, the coating agent is present in an amount from about 0.1 wt % to about 2 wt % based on the weight of the glass fibers.

In preparing the glass fibers, a number of filaments can be formed simultaneously, sized with the coating agent and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt %, about 0.1 to 2 wt % based on the weight of the glass fibers. Generally, this may be about 1.0 wt % based on the weight of the glass filament.

In a further aspect, the glass fiber can be continuous or chopped. In a still further aspect, the glass fiber is continuous. In yet a further aspect, the glass fiber is chopped. Glass fibers in the form of chopped strands may have a length of about 0.3 millimeter to about 10 centimeters, specifically about 0.5 millimeter to about 5 centimeters, and more specifically about 1.0 millimeter to about 2.5 centimeters. In various further aspects, the glass fiber has a length from about 0.2 mm to about 20 mm. In a yet further aspect, the glass fiber has a length from about 0.2 mm to about 10 mm. In an even further aspect, the glass fiber has a length from about 0.7 mm to about 7 mm. In this area, where a thermoplastic resin is reinforced with glass fibers in a composite form, fibers having a length of about 0.4 mm are generally referred to as long fibers, and shorter ones are referred to as short fibers. In a still further aspect, the glass fiber can have a length of 1 mm or longer. In yet a further aspect, the glass fiber can have a length of 2 mm or longer.

In a further aspect, the glass fiber component is present in an amount from about greater than about 0 wt % to about 60 wt %. In a still further aspect, the glass fiber component is present in an amount from greater than about 10 wt % to about 60 wt %. In a yet further aspect, the glass fiber component is present in an amount from greater than about 20 wt % to about 60 wt %. In an even further aspect, the glass fiber component is present in an amount from greater than about 30 wt % to about 60 wt %. In a still further aspect, the glass fiber component is present in an amount from greater than about 30 wt % to about 57 wt %.

In various further aspects, the glass fiber has a round (or circular), flat, or irregular cross-section. Thus, use of non-round fiber cross sections is possible. In a still further aspect, the glass fiber has a circular cross-section. In yet further aspect, the diameter of the glass fiber is from about 1 to about 35 μm. In an even further aspect, the diameter of the glass fiber is from about 4 to about 35 μm. In a still further aspect, the diameter of the glass fiber is from about 5 to about 30 μm. In a further aspect, the diameter of the glass fiber can range from about 10 to about 20 μm. In a further aspect, the glass fiber has a diameter from about 2 μm to about 15 μm. In a yet further aspect, the glass fiber has a diameter from about 3 μm to about 8 μm Optional Polymer Composition Additives In addition to the foregoing components, the disclosed blended thermoplastic compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include additional reinforcing fillers, an acid scavenger, anti-drip agent, antioxidant, antistatic agent, chain extender, colorant (e.g., pigment and/or dye), de-molding agent, flow promoter, lubricant, mold release agent, plasticizer, quenching agent, flame retardant stabilizer (including for example a thermal stabilizer, a hydrolytic stabilizer, or a light stabilizer), UV absorbing additive, and UV reflecting additive, or any combination thereof. In a further aspect, the additive is selected from an antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

In a further aspect, the disclosed blended thermoplastic compositions can further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants.

In a further aspect, the antioxidant is a primary antioxidant, a secondary antioxidant, or combinations thereof. In a still further aspect, the primary antioxidant is selected from a hindered phenol and secondary aryl amine, or a combination thereof. In yet a further aspect, the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate) methane, and octadecyl 3,5-di-tert-butylhydroxyhydrocinnamate. In an even further aspect, the hindered phenol comprises octadecyl-3-(3,5-di-t-butyl-4-hydroxyphenyl)-propionate.

In a further aspect, the secondary anti-oxidant is selected from an organophosphate and thioester, or a combination thereof. In a still further aspect, the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl)phosphite, bis(2,4-di-tert-butylphenyl)pentaerythritol diphosphite, bis(2,4-dicumylphenyl)pentaerytritoldiphosphite, tris(nonyl phenyl) phosphite, and distearyl pentaerythritol diphosphite. In yet a further aspect, the secondary anti-oxidant comprises tris(2,4-di-tert-butylphenyl)phosphite.

Antioxidants are generally used in amounts of about 0.01 wt % to about 3 wt %, optionally about 0.05 wt % to about 2.0 wt % of the blended thermoplastic composition.

In a further aspect, the primary antioxidant is present in an amount from about 0.01 wt % to about 3 wt %. In another aspect, the primary antioxidant is present in an amount from about 0.01 wt % to about 2.5 wt %. In still another aspect, the primary antioxidant is present in an amount from about 0.5 wt % to about 2.5 wt %. In yet a further aspect, the primary antioxidant is present in an amount from about 0.5 wt % to about 2.0 wt %. In still another aspect, the primary antioxidant is present in an amount from about 0.1 wt % to about 0.5 wt %. In still another aspect, the primary antioxidant is present in an amount from about 0.2 wt % to about 0.5 wt %. In still another aspect, the primary antioxidant is present in an amount from about 0.2 wt % to about 0.4 wt %. In a yet further aspect, the primary anti-oxidant is present in an amount from about 0.01 wt % to about 0.50 wt %. In an even further aspect, the primary anti-oxidant is present in an amount from about 0.05 wt % to about 0.25 wt %.

In a further aspect, the secondary antioxidant is present in an amount from about 0.01 wt % to about 3.0 wt %. In another aspect, the secondary antioxidant is present in an amount from about 0.01 wt % to about 2.5 wt %. In still another aspect, the secondary antioxidant is present in an amount from about 0.5 wt % to about 2.5 wt %. In yet another aspect, the secondary antioxidant is present in an amount from about 0.5 wt % to about 2.0 wt %. In still another aspect, the secondary antioxidant is present in an amount from about 0.05 wt % to about 0.4 wt %. In still another aspect, the secondary antioxidant is present in an amount from about 0.05 wt % to about 0.2 wt %. In a yet further aspect, the secondary anti-oxidant is present in an amount from about 0.01 wt % to about 0.50 wt %. In an even further aspect, the secondary anti-oxidant is present in an amount from about 0.05 wt % to about 0.25 wt %.

In various aspects, the disclosed blended thermoplastic compositions further comprise a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present disclosure. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable thermal stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing thermal stabilizers.

Thermal stabilizers are generally used in amounts of about 0.01 wt % to about 5 wt %, optionally about 0.05 wt % to about 2.0 wt % of the polycarbonate blend composition. In one aspect, the thermal stabilizer is present in an amount from about 0.01 wt % to about 3.0 wt %. In another aspect, the thermal stabilizer is present in an amount from about 0.01 wt % to about 2.5 wt %. In still another aspect, the thermal stabilizer is present in an amount from about 0.5 wt % to about 2.5 wt %. In still another aspect, the thermal stabilizer is present in an amount from about 0.5 wt % to about 2.0 wt %. In still another aspect, the thermal stabilizer is present in an amount from about 0.1 wt % to about 0.8 wt %. In still another aspect, the thermal stabilizer is present in an amount from about 0.1 wt % to about 0.7 wt %. In still another aspect, the thermal stabilizer is present in an amount from about 0.1 wt % to about 0.6 wt %. In still another aspect, the thermal stabilizer is present in an amount from about 0.1 wt % to about 0.5 wt %. In still another aspect, the thermal stabilizer is present in an amount from about 0.1 wt % to about 0.4 wt %. In still another aspect, the thermal stabilizer is present in an amount from about 0.05 wt % to about 1.0 wt %.

In various aspects, plasticizers, lubricants, and/or mold release agents additives can also be used. There is a considerable overlap among these types of materials, which include, for example, phthalic acid esters such as dioctyl-4,5-epoxy-hexahydrophthalate; tris(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g. methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof; waxes such as beeswax, montan wax, paraffin wax or the like.

Blended thermoplastic composition additives such as plasticizers, lubricants, and/or mold release agents additive are generally used in amounts of about 0.01 wt % to about 20 wt %, optionally about 0.5 wt % to about 10 wt % the polycarbonate blend composition. In one aspect, the mold release agent is methyl stearate; stearyl stearate or pentaerythritol tetrastearate. In another aspect, the mold release agent is pentaerythritol tetrastearate.

In various aspects, the mold release agent is present in an amount from about 0.01 wt % to about 3.0 wt %. In another aspect, the mold release agent is present in an amount from about 0.01 wt % to about 2.5 wt %. In still another aspect, the mold release agent is present in an amount from about 0.5 wt % to about 2.5 wt %. In still another aspect, the mold release agent is present in an amount from about 0.5 wt % to about 2.0 wt %. In still another aspect, the mold release agent is present in an amount from about 0.1 wt % to about 0.6 wt %. In still another aspect, the mold release agent is present in an amount from about 0.1 wt % to about 0.5 wt %.

In various aspects, the blended thermoplastic compositions of the present disclosure can optionally comprise a flame retardant, wherein the flame retardant can comprise any flame retardant material or mixture of flame retardant materials suitable for use in the inventive polymer compositions. In one aspect, the blended thermoplastic compositions of the present disclosure do not comprise a flame retardant.

In various aspects, the flame retardant is a phosphorus-containing flame retardant. In a further aspect, the flame retardant is selected from an oligomeric phosphate flame retardant, polymeric phosphate flame retardant, an aromatic polyphosphate flame retardant, oligomeric phosphonate flame retardant, phenoxyphosphazene oligomeric flame retardant, or mixed phosphate/phosphonate ester flame retardant compositions.

In a further aspect, the blended thermoplastic compositions comprise a flame retardant that is a non-brominated and non-chlorinated phosphorous-containing compound such as an organic phosphate. Exemplary organic phosphates can include an aromatic phosphate of the formula $(GO)_3P=O$, wherein each G is independently an alkyl, cycloalkyl, aryl, alkaryl, or aralkyl group, provided that at least one G is an aromatic group. Two of the G groups can be joined together to provide a cyclic group, for example, diphenyl pentaerythritol diphosphate, which is described by Axelrod in U.S. Pat. No. 4,154,775. Other suitable aromatic phosphates can be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

In a further aspect, di- or polyfunctional aromatic phosphorous-containing compounds can also be present. Examples of suitable di- or polyfunctional aromatic phosphorous-containing compounds include triphenyl phosphate (TPP), resorcinol tetraphenyl diphosphate (RDP), the bis (diphenyl)phosphate of hydroquinone and the bis(diphenyl) phosphate of bisphenol-A, respectively, their oligomeric and polymeric counterparts, and the like.

In a further aspect, the flame retardant can be an organic compounds containing phosphorous-nitrogen bonds. For example, phosphonitrilic chloride, phosphorous ester amides, phosphoric acid amides, phosphonic acid amides, phosphinic acid amides, tris(aziridinyl)phosphine oxide, or the like. In one aspect, a phenoxyphosphazene is used as a flame retardant.

Exemplary flame retardants include aromatic cyclic phosphazenes having a structure represented by the formula:

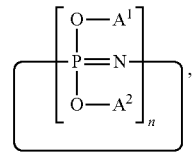

wherein each of $A^1$ and $A^2$ is independently an aryl group having 6 to 10 carbon atoms substituted with 0 to 4 C1-C4 alkyl groups; and n is an integer of 3 to 6. The aryl group of $A^1$ and $A^2$ means an aromatic hydrocarbon group having 6 to 10 atoms. Examples of such groups include phenyl and naphthyl groups. In a further aspect, the aryl group of $A^1$ and $A^2$ is independently selected from phenyl and naphthyl. In a still further aspect, the aryl group of $A^1$ and $A^2$ is phenyl. In a further aspect, aromatic cyclic phosphazene compound is a mixture of compounds represented by the foregoing formula, comprising a mixture of compounds with n=3, n=4, n=5, and n=6.

The "aryl group having 6 to 10 carbon atoms" can be substituted with 0 to 4 C1-C4 alkyl groups, wherein the alkyl group means a straight or branched saturated hydrocarbon group having 1 to 4 carbon atoms. Examples of the group include a methyl group, an ethyl group, a propyl group, an isopropyl group, a butyl group, an isobutyl group, a sec-butyl group, and a tert-butyl group. In various further aspects, the alkyl group has 1 to 3 carbon atoms. In a still further aspect, the alkyl group is methyl.

In a further aspect, each of $A^1$ and $A^2$ is a phenyl group, wherein each of $A^1$ and $A^2$ is independently substituted with 0 to 4 C1-C4 alkyl groups. In a still further aspect, each of $A^1$ and $A^2$ is a phenyl group, wherein each of $A^1$ and $A^2$ is independently substituted with 0 to 4 C1-C3 alkyl groups. In a yet further aspect, each of $A^1$ and $A^2$ is a phenyl group independently substituted with 0 to 4 methyl groups. In an even further aspect, each of $A^1$ and $A^2$ is independently selected from phenyl, o-tolyl, p-tolyl, and m-tolyl.

In various further aspects, three to six $A^1$ groups are present, wherein each $A^1$ group can be the same as or different from each other. In a further aspect, three to six $A^1$ groups are present, wherein each $A^1$ group is the same.

In various further aspects, three to six $A^2$ groups are present, wherein each $A^2$ group can be the same as or different from each other. In a further aspect, three to six $A^2$ groups are present, wherein each $A^2$ group is the same. In a yet further aspect, each $A^1$ and each $A^2$ are the same moiety.

In a further aspect, aromatic cyclic phosphazenes useful in the present disclosure are compounds having a structure represented by the formula:

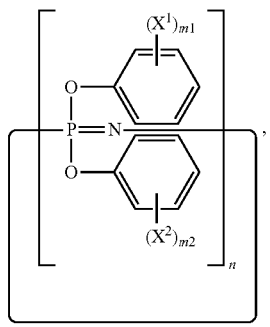

wherein each occurrence of $X^1$ and $X^2$ is independently a C1-C4 alkyl group; wherein each of m1 and m2 is independently an integer of 0 to 4; and wherein n is an integer of 3 to 6. As described above, alkyl group means a straight or branched saturated hydrocarbon group having 1 to 4 carbon atoms. Examples of the group include a methyl group, an ethyl group, a propyl group, an isopropyl group, a butyl group, an isobutyl group, a sec-butyl group, and a tert-butyl group. In various further aspects, the alkyl group has 1 to 3 carbon atoms. In a still further aspect, the alkyl group is methyl. In a further aspect, each of m1 and m2 is independently an integer of 0 to 3. In a still further aspect, each of m1 and m2 is independently an integer of 0 to 2. In a yet further aspect, each of m1 and m2 is independently an integer that is 0 or 1. In an even further aspect, each of m1 and m2 is 0. In a still further aspect, each of m1 and m2 is 1.

In various further aspects, three to six $X^1$ groups are present, wherein each $X^1$ group can be the same as or different from each other. In a further aspect, three to six $X^1$ groups are present, wherein each $X^1$ group is the same.

In various further aspects, three to six $X^2$ groups are present, wherein each $X^2$ group can be the same as or different from each other. In a further aspect, three to six $X^2$ groups are present, wherein each $X^2$ group is the same. In a yet further aspect, each $X^1$ and each $X^2$ are the same moiety.

In various further aspects, the aromatic cyclic phosphazene is a compound selected from Examples of the compound represented by General Formula (I) include 2,2,4,4,6,6-hexaphenoxycyclotriphosphazene, 2,2,4,4,6,6-hexakis(p-tolyloxy)cyclotriphosphazene, 2,2,4,4,6,6-hexakis(m-tolyloxy)cyclotriphosphazene, 2,2,4,4,6,-hexakis(o-tolyloxy) cyclotriphosphazene, 2,4,6-triphenoxy-2,4,6-tris(p-tolyloxy)cyclotriphosphazene, 2,4,6-triphenoxy-2,4,6-tris(m-tolyloxy)cyclotriphosphazene, 2,4,6-triphenoxy-2,4,6-tris(o-tolyloxy)cyclotriphosphazene, 2,4,6-triphenoxy-2,4,6-tris(2-ethylphenoxy)cyclotriphosphazene, 2,4,6-triphenoxy-2,4,6-tris(3-ethylphenoxy)cyclotriphosphazene, 2,4,6-triphenoxy-2,4,6-tris(4-ethylphenoxy)cyclotriphosphazene, 2,4,6-triphenoxy-2,4,6-tris(2,3-xylyloxy)cyclotriphosphazene, 2,4,6-triphenoxy-2,4,6-tris(2,4-xylyloxy)cyclotriphosphazene, 2,4,6-triphenoxy-2,4,6-tris(2,5-xylyloxy) cyclotriphosphazene, 2,4,6-triphenoxy-2,4,6-tris(2,6-xylyloxy)cyclotriphosphazene, 2,4,6-triphenoxy-2,4,6-tris (3,4-xylyloxy)cyclotriphosphazene, 2,4,6-triphenoxy-2,4,6-tris(3,5-xylyloxy)cyclotriphosphazene, 2,2,4,4,6,6,8,8-octaphenoxycyclotetraphosphazene, 2,2,4,4,6,6,8,8-octakis (p-tolyloxy)cyclotetraphosphazene, 2,2,4,4,6,6,8,8-octakis (m-tolyloxy)cyclotetraphosphazene, 2,2,4,4,6,6,8,8-octakis (o-tolyloxy)cyclotetraphosphazene, 2,4,6,8-tetraphenoxy-2, 4,6,8-tetrakis(p-tolyloxy)cyclotetraphosphazene, 2,4,6,8-tetraphenoxy-2,4,6,8-tetrakis(m-tolyloxy) cyclotetraphosphazene, and 2,4,6,8-tetraphenoxy-2,4,6,8-tetrakis(o-tolyloxy)cyclotetraphosphazene. In a still further aspect, the aromatic cyclic phosphazene is selected from 2,2, 4,4,6,6-hexaphenoxycyclotriphosphazene, 2,4,6-triphenoxy-2,4,6-tris(p-tolyloxy)cyclotriphosphazene, 2,4,6-triphenoxy-2,4,6-tris(m-tolyloxy)cyclotriphosphazene, and 2,4, 6-triphenoxy-2,4,6-tris(o-tolyloxy)cyclotriphosphazene.

In a further aspect, the aromatic cyclic phosphazene comprises at least one compound represented by one of the phosphazene formulas described herein as a main component. In various aspects, the content of the aromatic cyclic phosphazene composition is about 90 wt %. In a further aspect, the content of the aromatic cyclic phosphazene composition is about 95 wt %. In a still further aspect, the content of the aromatic cyclic phosphazene composition is about 100 wt %.

Other components in the aromatic cyclic phosphazene composition are not specifically limited as long as the object of the present disclosure is not impaired. Aromatic cyclic phosphazene-containing flame retardant useful in the present disclosure are commerically available. Suitable examples of such commercial products include "Rabitle FP-110" and "Rabitle FP-390" manufactured by FUSHIMI Pharmaceutical Co., Ltd.

In a further aspect, the phosphorus-containing flame retardant is selected from a phosphine, a phosphine oxide, a bisphosphine, a phosphonium salt, a phosphinic acid salt, a phosphoric ester, and a phosphorous ester.

In a further aspect, the phosphorus-containing flame retardant is selected from rescorcinol bis(diphenyl phosphate), resorcinol bis(dixylenyl phosphate), hydroquinone bis (diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate and dipyrocatechol hypodiphosphate. In a still further aspect, the flame retardant is selected from triphenyl phosphate; cresyl-diphenylphosphate; tri(isopropylphenyl)phosphate; resorcinol bis(diphenylphosphate); and bisphenol-A bis(diphenyl phosphate). In a yet further aspect, resorcinol bis(biphenyl phosphate), bisphenol A bis(diphenyl phosphate) hydroquinone bis(diphenyl phosphate), phosphoric acid, 1,3-phenylene tetraphenyl ester), bis-phenol-A bis-diphenyl phosphate) or mixtures thereof. In an even further aspect, the flame retardant is bisphenol-A bis(diphenyl phosphate). In a still further aspect, the phosphorus-containing flame retardant is selected from resorcinol bis(biphenyl phosphate), bisphenol A bis(diphenyl phosphate), and hydroquinone bis(diphenyl phosphate), or mixtures thereof. In yet a further aspect, the phosphorus-containing flame retardant is bisphenol A bis (diphenyl phosphate). In an even further aspect, the phosphorus-containing flame retardant is resorcinol bis(biphenyl phosphate).

In a further aspect, the flame retardant is present in an amount from greater than about 0 wt % to about 15 wt %. In a still further aspect, the flame retardant is present in an amount from about 0.01 wt % to about 15 wt %. In a yet further aspect, the flame retardant is present in an amount from about 0.1 wt % to about 15 wt %. In an even further aspect, the flame retardant is present in an amount from about 1 wt % to about 15 wt %.

In a further aspect, the flame retardant is present in an amount from about 1 wt % to about 1 wt %. In a still further aspect, the flame retardant is present in an amount from about 1 wt % to about 13 wt %. In yet a further aspect, the flame retardant is present in an amount from about 1 wt % to about 12 wt %. In an even further aspect, the flame retardant is present in an amount from about 2 wt % to about 12 wt %. In a still further aspect, the flame retardant is present in an amount from about 3 wt % to about 12 wt %. In yet a further aspect, the flame retardant is present in an amount from about 4 wt % to about 12 wt %. In an even further aspect, the flame retardant is present in an amount from about 4 wt % to about 11 wt %. In a still further aspect, the flame retardant is present in an amount from about 4 wt % to about 10 wt %. In yet a further aspect, the flame retardant is present in an amount from about 5 wt % to about 10 wt %. In an even further aspect, the flame retardant is present in an amount from about 6 wt % to about 10 wt %.

In a further aspect, an anti-drip agent can also be present. In a further aspect, the anti-drip agent is a styrene-acrylonitrile copolymer encapsulated polytetrafluoroethylene. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

In a further aspect, the anti-drip agent is present in an amount from about 0.01 wt % to about 3 wt %. In a still further aspect, the anti-drip agent is present in an amount from about 0.01 wt % to about 2.5 wt %. In yet a further aspect, the anti-drip agent is present in an amount from about 0.5 wt % to about 2.0 wt %.

In various aspects, the blended thermoplastic compositions of the present disclosure can optionally further comprise reinforcing fillers in addition to one or more glass fiber fillers as described herein above. For example, suitable fillers or reinforcing agents include any materials known for these uses, provided that they do not adversely affect the desired properties. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers; sulfides such as molybdenum sulfide, zinc sulfide, or the like; barium compounds such as barium titanate, barium ferrite, barium sulfate, heavy spar, or the like; metals and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, Tripoli, diatomaceous earth, carbon black, or the like, or combinations comprising at least one of the foregoing fillers or reinforcing agents. In a still further aspect, the filler is talc, glass fiber, kenaf fiber, or combinations thereof. In yet a further aspect, the filler is glass fiber. The fillers and reinforcing agents can be coated with a layer of metallic material to facilitate conductivity, or surface treated with silanes, siloxanes, or a combination of silanes and siloxanes to improved adhesion and dispersion with the polymeric matrix resin.

In a further aspect, the additional reinforcing filler is selected from carbon fiber, a mineral filler, or combinations thereof. In a still further aspect, the reinforcing filler is selected from mica, talc, clay, wollastonite, zinc sulfide, zinc oxide, carbon fiber, ceramic-coated graphite, titanium dioxide, or combinations thereof.

In a further aspect, the reinforcing fillers can be provided in the form of monofilament or multifilament fibers and can be used either alone or in combination with other types of fiber, for example, co-weaving or core/sheath, side-by-side, orange-type or matrix and fibril constructions, or by other methods known to one skilled in the art of fiber manufacture. Suitable co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In one aspect, the reinforcing fillers can be surface-treated with a surface treatment agent containing a coupling agent. Suitable coupling agents include, but are not limited to, silane-based coupling agents, or titanate-based coupling agents, or a mixture thereof. Applicable silane-based coupling agents include aminosilane, epoxysilane, amidosilane, azidosilane and acrylsilane.

In various aspects, the surface coating can range in amount from about 0.1 wt % to about 5.0 wt % of the total weight of the filler and surface coating. In a further aspect, the surface coating can range in amount from about 0.1 wt % to about 2.0 wt % of the total weight of the filler and surface coating.

In a further aspect, the reinforcing filler is particulate.

In a further aspect, the reinforcing filler is fibrous. In a still further aspect, the fibrous filler has a circular cross-section. In yet a further aspect, the fibrous filler has a non-circular cross-section.

In a further aspect, the additional reinforcing filler is a carbon fiber. In a still further aspect, the carbon fiber is continuous. In yet a further aspect, the carbon fiber is chopped. In an even further aspect, the carbon fiber has a round, flat, or irregular cross-section. In a still further aspect, the carbon fiber has a round cross-section. In yet a further aspect, the carbon fiber has a diameter from about 4 μm to about 15 μm.

Methods of Manufacture

The blended thermoplastic compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, the polycarbonate polymer, polyester polymer, the flame retardant, the reinforcing filler and/or other optional components are first blended in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In one aspect, the present disclosure pertains to methods of improving the impact strength and dielectric constant of a blended thermoplastic composition, the method comprising the step of combining: (a) from about 5 wt % to about 25 wt % of a polycarbonate component; (b) from about 20 wt % to about 50 wt % of a polybutylene terephthalate component; (c) from greater than about 0 wt % to about 5 wt % of a polyester ether elastomer component; (d) from greater than about 0 wt % to about 5 wt % of an poly(ethylene-co-ethylacrylate) component; (e) from greater than about 0 wt % to about 3 wt % of an ethylene/alkyl acrylate/glycidyl methacrylate terpolymer component; and (f) from greater than about 0 wt % to about 60 wt % of a glass fiber component; wherein the wt % ratio of the polycarbonate component to polybutylene terephthalate component is less than or equal to about 0.5; wherein the combined weight percent value of all components does not exceed about 100 wt %; wherein all weight percent values are based on the total weight of the composition.

In one aspect, the present disclosure pertains to methods of improving the impact strength and dielectric constant of a blended thermoplastic composition, the method comprising the step of combining: (a) from about 5 wt % to about 25 wt % of a polycarbonate component; (b) from about 20 wt % to about 50 wt % of a polybutylene terephthalate component; (c) from greater than about 0 wt % to about 5 wt % of a polyester ether elastomer component; (d) from greater than about 0 wt % to about 5 wt % of an poly(ethylene-co-ethylacrylate) component; (e) from greater than about 0 wt % to about 3 wt % of an ethylene/alkyl acrylate/glycidyl methacrylate terpolymer component; (f) from greater than about 0 wt % to about 60 wt % of a glass fiber component; (g) from greater than about 0 wt % to about 2 wt % of a transesterification quencher; and (h) from greater than about 0 wt % to about 5 wt % of an epoxy hydrostabilizer agent; wherein the wt % ratio of the polycarbonate component to polybutylene terephthalate component is less than or equal to about 0.5; wherein the combined weight percent value of all components does not exceed about 100 wt %; and wherein all weight percent values are based on the total weight of the composition.

Articles of Manufacture

In one aspect, the present disclosure pertains to shaped, formed, or molded articles comprising the blended thermoplastic compositions. The blended thermoplastic compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like. In a further aspect, the article is extrusion molded. In a still further aspect, the article is injection molded.

In various aspects, the polymer composition can be used in the field of electronics. In a further aspect, non-limiting examples of fields which can use the disclosed blended thermoplastic polymer compositions include electrical, electromechanical, radio frequency (RF) technology, telecommunication, automotive, aviation, medical, sensor, military, and security. In a still further aspect, the use of the disclosed blended thermoplastic polymer compositions can also be present in overlapping fields, for example in mechatronic systems that integrate mechanical and electrical properties which may, for example, be used in automotive or medical engineering.

In a further aspect, the article is an electronic device, automotive device, telecommunication device, medical device, security device, or mechatronic device. In a still further aspect, the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device. In yet a further aspect, the article is selected from a computer device, sensor device, security device, RF antenna device, LED device and RFID device. In an even further aspect, the article is selected from a computer device, RF antenna device, LED device and RFID device. In a still further aspect, the article is selected from a RF antenna device, LED device and RFID device. In yet a further aspect, the article is selected from a RF antenna device and RFID device. In an even further aspect, the article is a LED device. In a still further aspect, the LED device is selected from a LED tube, a LED socket, and a LED heat sink.

In various aspects, molded articles according to the present disclosure can be used to produce a device in one or more of the foregoing fields. In a still further aspect, non-limiting examples of such devices in these fields which can use the disclosed blended thermoplastic polymer compositions according to the present disclosure include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein.

TABLE 1

| Item | Description | Supplier |
|---|---|---|
| PBT (LM) | Polybutylene terephthalate with an intrinsic viscosity from about 0.63 to about 0.68, and a melt viscosity from about 740 to about 900 poise; available under the trade name Valox ™ 195. | SABIC Innovative Plastics ("SABIC I.P.") |
| PBT (HM) | Polybutylene terephthalate with an intrinsic viscosity from about 1.15 to about 1.15, and a melt viscosity from about 7500 to about 9500 poise; available under the trade name Valox ™ 315. | SABIC I.P. |
| PC | High-flow-ductile (HFD, BPA-sebacic acid copolymer) PC copolymer with sebacic acid at 8% and below, Mw < 29,000 by PC standards. | SABIC I.P. |
| GF1 | Chopped s-glass fibers HPXSS PAX95 at 10 μm diameter and 4 mm in length. | Owens Corning |
| GF2 | Chopped e-glass fibers at 10 μm diameter | CPIC |
| HS | Tris(2,4-ditert-butylphenyl) phosphite, CAS 31570-04-4; commercially available under the trade name IRGAFOS 168. | Ciba Specialty Chemicals Corporation |
| AO | Pentaerythritol tetrakis(3,5-di-tert-butyl-4-hydroxy hydrocinnamate), CAS 6683-19-8; available under the trade name IRGANOX 1010. | CIBA-GEIGY |
| TQ | Zinc phosphate monobasic (Zn(H2PO4)2). Z1-82 | BUDENHEIM USA, INC |
| NA1 | Sodium Stearate. EA-FG | Witco |
| NA2 | Silicon dioxide. | |
| EH | Diglycidylether of bisphenol A, MW~1000. DER 661 | Dow Chemical |
| IM1 | Polyester ether block copolymer with a polybutylene terephthalate block and a | E. I. DuPont de Nemours & Co. |

TABLE 1-continued

| Item | Description | Supplier |
|---|---|---|
| IM3 | Blend of polycarbonate (about 80 wt %) and random terpolymer of ethylene, methyl acrylate and glycidyl methacrylate (about 20 wt %). | Arkema, Inc. |

In each of the examples, sample batches (5 kg) were prepared by compounding the materials in a ZSK 40 mm twin screw extruder. The barrel temperatures ranged from 470° F. to 550° F. The screw speed was 100 rpm and the feed rate was 110 lbs/hr. To make test specimens, the dried pellets were injection molded to form appropriate test samples with barrel temperatures of 510 to 550° F. and mold temperature set to 200 to 225° F.

Notched and unnotched Izod impact strength ('NII') were determined in accordance with ASTM D256.

Tensile strength, elongation, and modulus were determined in accordance with ASTM D638.

Flexural strength and modulus were determined in accordance with ASTM D790.

Dielectric constants (Dk) and dissipation factors (Df) were determined at the specified frequencies according to internal SABIC protocols, for example, methods using split post dielectric resonators.

Table 2 below shows the formulations of exemplary compositions of the present disclosure. Table 3 shows the formulations of two conventional thermoplastic blend compositions used as comparative compositions.

TABLE 2*

| No. | Item | Example 1 | Example 2A | Example 2B | Example 3A | Example 4 |
|---|---|---|---|---|---|---|
| 1 | PBT (LM) | 46.11 | 32.69 | 37.5 | 33.40 | 29.07 |
| 2 | PBT (HM) | — | 8 | — | — | — |
| 3 | PC | 14.0 | 12.0 | 11.11 | 9.0 | 7.0 |
| 4 | GF | 22.0 | 35.0 | 32.41 | 45.0 | 55.0 |
| 5 | HS | 0.15 | 0.1 | 0.14 | 0.15 | 0.15 |
| 6 | AO | 0.15 | 0.06 | 0.14 | 0.15 | 0.15 |
| 7 | TQ | 0.15 | 0.05 | 0.09 | 0.15 | 0.10 |
| 8 | NA1 | 0.10 | 0.05 | 0.05 | 0.05 | 0.03 |
| 9 | EH | 1.50 | 1.50 | 1.39 | 1.50 | 1.00 |
| 10 | IM1 | 3.00 | 3.00 | 2.78 | 3.00 | 1.90 |
| 11 | IM2 | 3.74 | 2.151 | 1.99 | 2.20 | 1.50 |
| 12 | IM3 | 9.00 | 5.3 | 4.91 | 5.30 | 4.00 |
| | TOTAL | 100 | 100 | 100 | 100 | 100 |

*Amounts provided in terms of percent of total composition (by weight).

TABLE 1-continued

| Item | Description | Supplier |
|---|---|---|
| | poly(tetrahydrofuran) block (about 45 wt %) and it has a melt mass flow rate (MFR) of about 5.3 g/10 min when tested at 190° C. under a load of 2.16 kg when tested in accordance with ASTM D1238; available under the trade name Hytrel ® 4056. | ("DuPont") |
| IM2 | Poly(ethylene-co-ethylacrylate) that is about 15 wt % ethyl acrylate and it has a melt mass flow rate (MFR) of about 6 g/10 min when tested at 190° C. under a load of 2.16 kg when tested in accordance with ASTM D1238; available under the trade name Elvaloy ® 2615C. | DuPont |

TABLE 3*

| No. | Item | Xenoy 6370 | 9X11427 |
|---|---|---|---|
| 1 | PBT (LM) | 23.87 | 26.13 |
| 2 | PBT (HM) | 15.83 | 6.56 |
| 3 | HFD PC LM | — | 11.5 |
| 4 | PC HM | 5.89 | — |
| 5 | PC LM | 9.09 | — |
| 6 | GF1 | — | 44.0 |
| 7 | GF2 | 29.97 | — |
| 8 | HS | — | 0.15 |
| 9 | AO | 0.06 | 0.15 |
| 10 | TQ | 0.10 | 0.10 |
| 11 | NA2 | 0.20 | — |

TABLE 3*-continued

| No. | Item | Xenoy 6370 | 9X11427 |
|---|---|---|---|
| 12 | IM1 | 11.99 | 9.16 |
| 13 | IM2 | 3.00 | 2.29 |
|  | TOTAL | 100 | 100 |

*Amounts provided in terms of percent of total composition (by weight).

Table 4 below shows the mechanical properties of both the inventive and comparative compositions.

TABLE 4

| No. | Test/Description | Unit | Example 1 | Example 2 | Example 3A | Example 4 | Xenoy 6370 | 9X11427 |
|---|---|---|---|---|---|---|---|---|
| 1 | Glass type | — | S | S | S | S | E | S |
| 2 | Glass content | wt % | 20% | 30% | 45% | 55% | 30% | 44% |
| 3 | Viscosity at 3000–1 shear rate, 285° C. | Pa · s | 78 | 92 | 127 | 158 | 172 | |
| 4 | MFR (5 kg, 285° C.)* | g/10 min | 60 | 33 | 32 | 14 | 24 | 6 |
| 5 | Tensile Modulus | MPa | 7626 | 11060 | 16800 | 21840 | 9750 | 14600 |
| 6 | Tensile Strength at Yield | MPa | 138 | 162 | 190 | 184 | 97 | 150 |
| 7 | Tensile Elongation | % | 3.0 | 2.6 | 2.5 | 1.5 | 3.0 | 2.7 |
| 8 | Flex Modulus | MPa | 6920 | 9680 | 14200 | 18200 | 5370 | 12900 |
| 9 | Flex Strength | MPa | 202 | 229 | 280 | 284 | 150 | 229 |
| 10 | Notched Izod Impact strength | J/m | 145 | 159 | 196 | 149 | 170 | 159 |
| 11 | Unotched Izod impact strength | J/m | 1060 | 1070 | 1230 | 938 | 640 | 1100 |

*Except formulation 6370 at which was determined under the same load, but at 250° C.

As the data shows, Example 3A exhibited better overall mechanical performance when compared to 9X11427, which has a comparable s-glass content. Specifically, Example 3A showed lower viscosity and a higher melt flow index. Moreover, Example 3A exhibited both higher stiffness (tensile and flexural modulus) and higher strength (tensile and flexural strength) than 9X11427.

To evaluate chemical resistance, both Example 3A and 9X11427 parts were then treated with diethylene triamine (DETA), a known solvent to of polycarbonate. To this end, DETA is often used to remove PC phase from the PBT phase for phase separation studies of PC/PBT blends.

FIG. 1 shows representative micrographs obtained by scanning electron microscopy (SEM) of representative blended thermoplastic compositions of the present disclosure before and after treatment with diethylenetriamine (DETA). (Panel A) a molded part formed from formulation 9X11427 prior to DETA treatment; (Panel B) a molded part formed from formulation 9X11427 after DETA treatment for 24 hr; (Panel C) a molded part formed from formulation Example 3A prior to DETA treatment; and (Panel D) a molded part formed from formulation Example 3A after DETA treatment for 24 hr.

As the figures demonstrate, parts formed from the Example 3A formulation exhibit higher chemical resistance to DETA than the 9X11427 parts. Without wishing to be bound by a particular theory, it is believed that the PC phase is even distributed in a much smaller size scale in the continuous PBT phase. Additionally, it further believed that due to the low Mw PBT used in Example 3A, which crystallizes faster than high Mw PBT during processing, the crystallinity is higher in the Example 3A formulation, which can contribute to the improved chemical resistance.

Next, the mechanical property retention was evaluated following chemical treatment of Example 2 (e.g., 2A-2B) (PC/PBT/35% s-glass) formulated with low Mw PBT ((Example 2A, in natural color) and high Mw PBT (Example 2B) in natural color). The samples were immersed in acids as follows: (Panel A) chemical treatment with acetic acid; (Panel B) chemical treatment with up to 40% nitric acid; (Panel C) chemical treatment with up to 75% sulfuric acid; and (Panel D) chemical treatment with up to 95% oleic acid. Table 5 below lists the chemical used to treat the sample and the mechanical retention of the samples following chemical treatment. The tensile tests were carried out under 0% strain rate after exposure to the chemicals for 2 hrs.

TABLE 5

| Chemical | Test Detail | Example 2A | Example 2B |
|---|---|---|---|
| Acetic Acid | Tensile Modulus of Elasticity | 100% | 103% |
|  | Tensile Strength at Break | 100% | 100% |
|  | % Elongation at Break | 99% | 103% |
| Up to 40% Nitric Acid | Tensile Modulus of Elasticity | 101% | 100% |
|  | Tensile Strength at Break | 100% | 100% |
|  | % Elongation at Break | 98% | 101% |
| Up to 75% Sulfuric Acid | Tensile Modulus of Elasticity | 101% | 100% |
|  | Tensile Strength at Break | 100% | 99% |
|  | % Elongation at Break | 99% | 101% |
|  | Tensile Modulus of Elasticity | 102% | 100% |

As the data reveals, the mechanical property retention for both formulation was exceptional (>95%). In addition to the excellent mechanical property retention, the parts also presented intact surfaces following chemical treatments.

Next, the stain resistance of Example 2 was evaluated. In this assessment, test specimens are surface treated with various chemicals and compounds for 48 hours. Following the 48 hours, the surface of the test specimen was visually examined for visible surface stains. Surface examination of the samples revealed no noticeable stain after exposure for 48 hrs, except for sample chip (3), representing French's yellow mustard. To this end, yellow mustard is known to stain easily, and hard to remove. However, the chemical resistance of the Example 2 sample is sufficient enough that there was only light tint of yellowness left on the surface. The yellow pigment in the mustard is turmeric, which is unstable under the sunlight. After only one day of exposure to the sunlight, the light tint also went away and not able to be detected by eyes. In the absence of sufficient chemical resistance, the yellow pigment would be allowed to penetrate too deep, thereby leading to permanent staining.

Figure 3E:
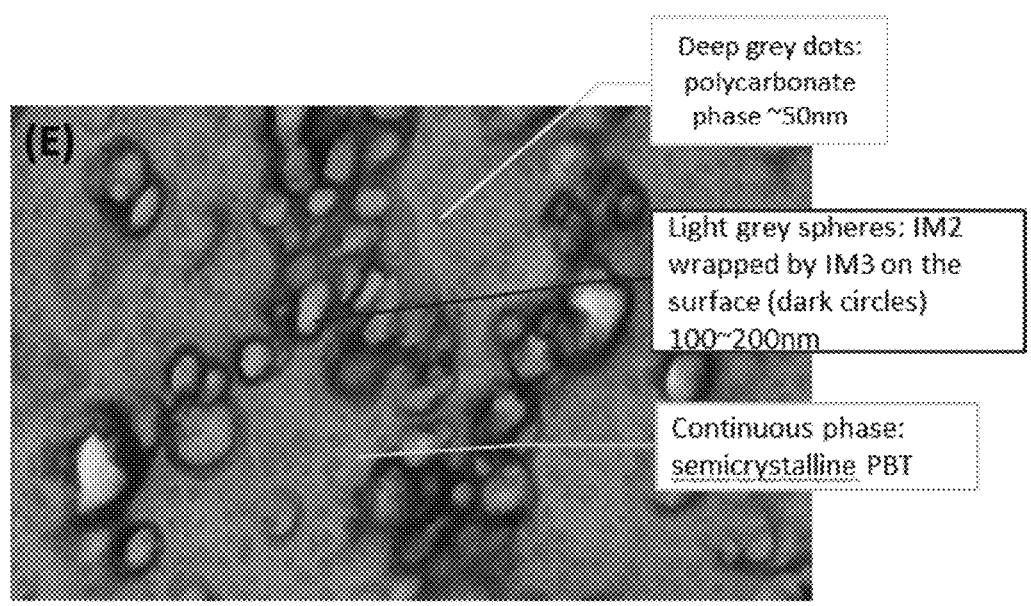
FIG. 3 shows representative micrographs obtained by transmission electron microscopy (TEM). The micrographs were obtained from a molded sample prepared using formulation Example 1 with 22 wt % glass fiber. (Panel A) magnification at 2,000×, and it should be noted that the large circles edged with very dark marked indicated with "GF" represent cross section of glass fiber; (Panel B) magnification at 5,000×, and it should be noted that the large circles edged with very dark marked indicated with "GF" represent cross section of glass fiber; (Panel C) magnification at 10,000×; (Panel D) magnification at 25,000×; and (Panel E) shows annotation as indicated to the same sample as shown in Panel D.

Next, the white colorability of inventive formulations were evaluated against the comparative formulations. Table 6 below shows the list of white colorability of inventive formulations compared with conventional, glass-filled specialty nylon and PEEK formulations. As an example, samples containing E-glass have the similar capability of white colorability as the samples containing similar content of S-glass.

diameter in a continuous semicrystalline polybutylene terephthalate phase. The image also shows light grey spheres comprising IM2 wrapped by IM3 distributed in the continuous semicrystalline polybutylene terephthalate phase. The spheres comprising IM2 wrapped by IM3 can be spherical or plate shaped, depending upon specific processing conditions. Similar results were obtained in the presence of glass fiber (see FIGS. 3d and 3e).

Without wishing to be bound by a particular theory, the foregoing results are consistent with the following: the presence of a functionalized reactive elastomeric compatibilizer, IM3, reacts with the non-reactive elastomeric modifier, IM2, and the IM2/IM3 material is dispersed within the continuous PBT matrix with resultant good interfacial adhesion and robust mechanical properties. In contrast, without wishing to be bound by a particular theory, this result is in contrast to a formulation without an IM3, wherein a non-reactive elastomer can be distributed within a continuous polyester matrix such as PBT with resultant low interfacial adhesion and poor mechanical properties.

TABLE 6

| No. | Test Detail | Unit | Example 1 | Example 2 | Example 3A | Example 4 | PARA/ Glass | PEEK/ Glass |
|---|---|---|---|---|---|---|---|---|
| 1 | Glass content | wt % | 20% | 30% | 45% | 55% | 30-50% | 30% |
| 2 | L* | — | 95 | 93 | 91 | 85 | N/A | N/A |

Figure 2E:
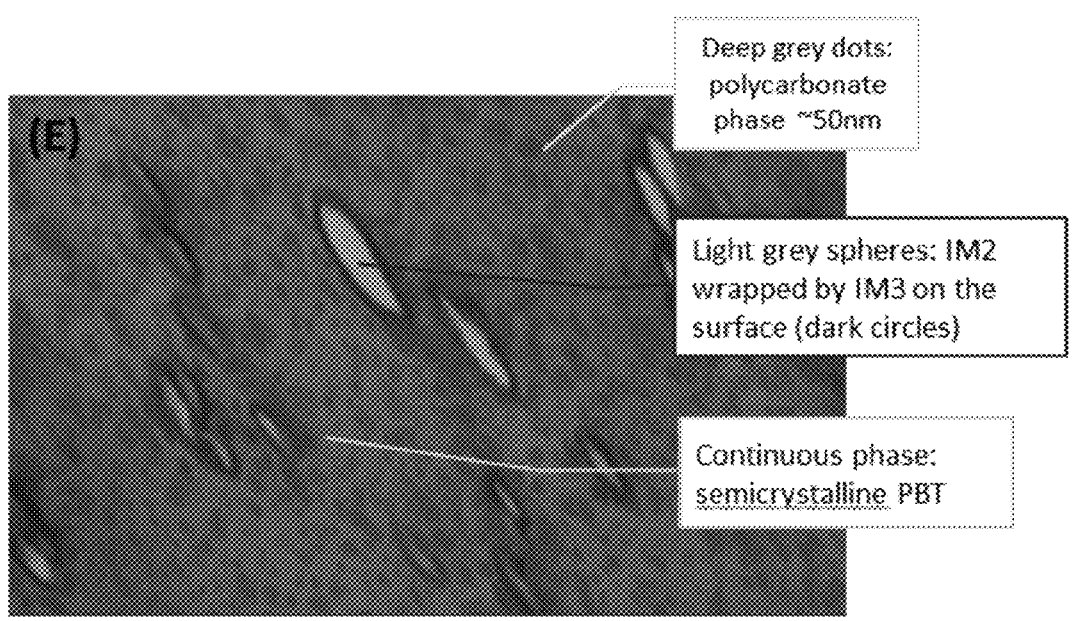
FIG. 2 shows representative micrographs obtained by transmission electron microscopy (TEM). The micrographs were obtained from a molded sample prepared using formulation Example 1 without glass fiber. (Panel A) magnification at 2,000×; (Panel B) magnification at 5,000×; (Panel C) magnification at 10,000×; (Panel D) magnification at 25,000×; and (Panel E) shows annotation as indicated to the same sample as shown in Panel D.
Figure 4:
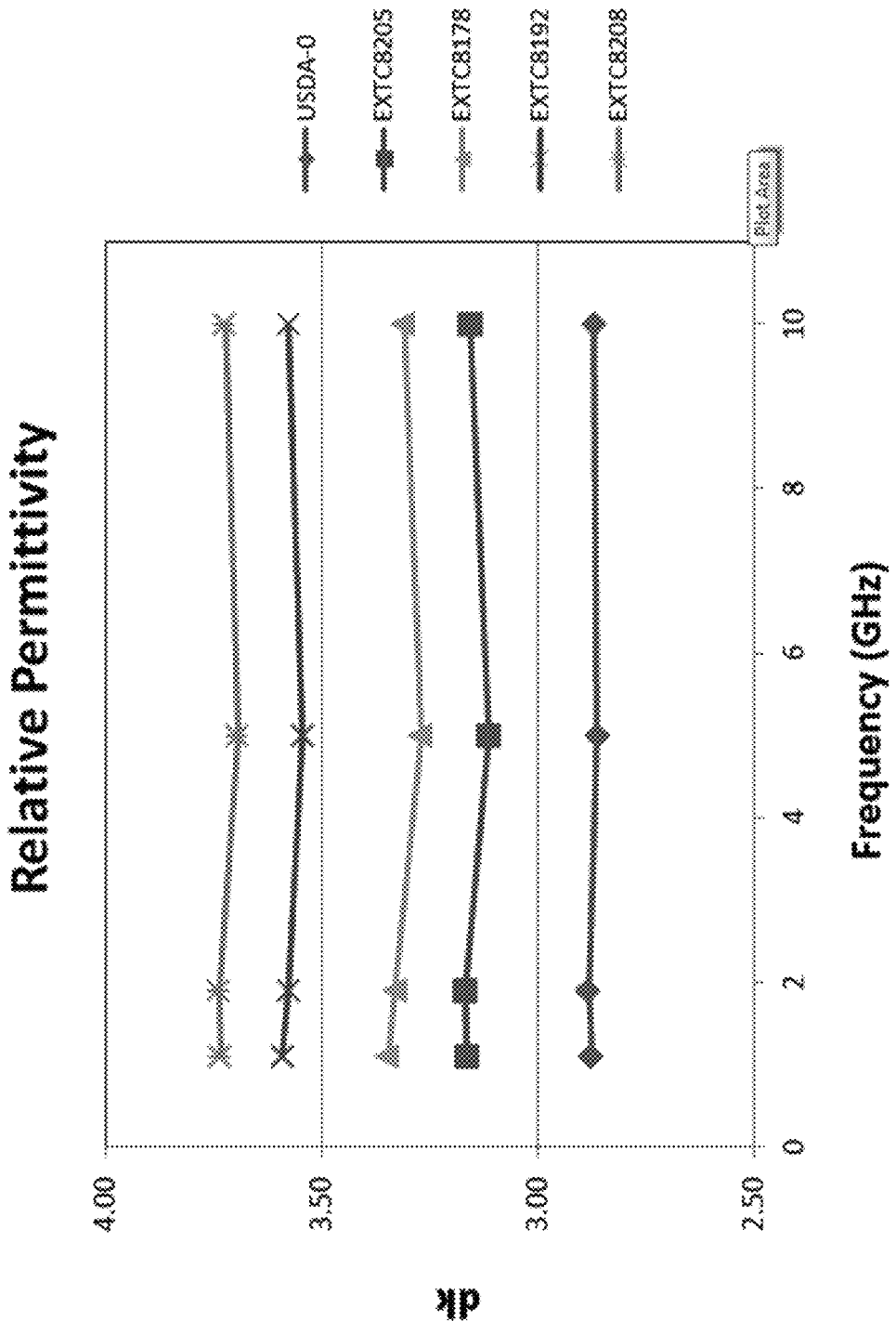
FIG. 4 shows representative dielectric properties (i.e. the dielectric constant, dk, as a function of frequency) obtained for molded samples prepared from the formulations indicated in the legend shown with the graphical data.
Figure 5:
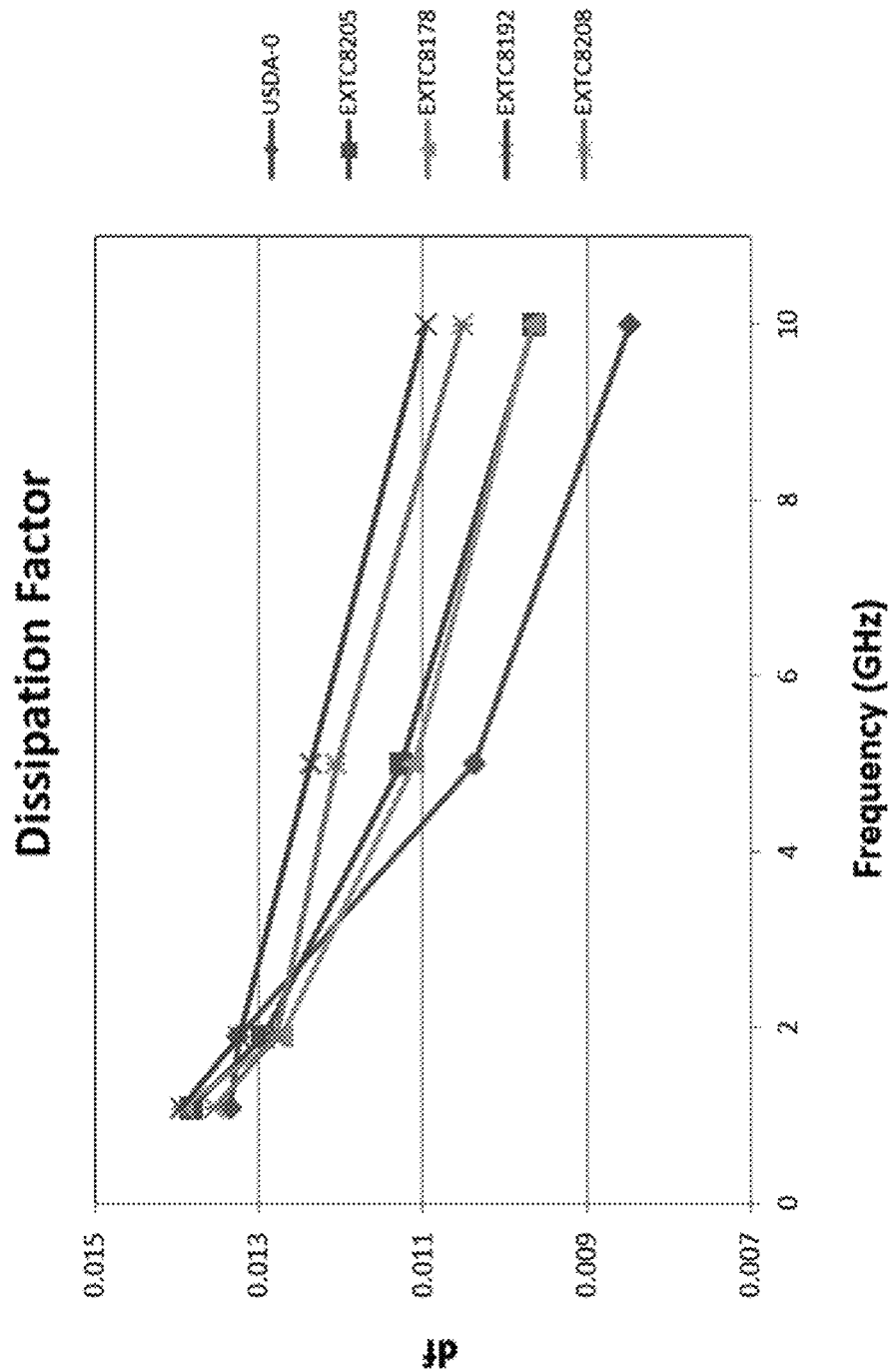
FIG. 5 shows representative dielectric properties (i.e. the dissipation factor, df, as a function of frequency) obtained for molded samples prepared from the formulations indicated in the legend shown with the graphical data.

The microstructure and microphase separation of a representative formulation, Example 1, was assessed by transmission electron microscopy in the absence (see FIG. 2) and presence (see FIG. 3) of 22 wt % glass fiber. FIG. 4 shows representative micrographs obtained by transmission electron microscopy (TEM). The micrographs were obtained from a molded sample prepared using formulation Example 1 without glass fiber. (Panel A) magnification at 2,000×; (Panel B) magnification at 5,000×; (Panel C) magnification at 10,000×; (Panel D) magnification at 25,000×; and (Panel E) shows annotation as indicated to the same sample as shown in Panel D. FIG. 3 shows representative micrographs obtained by transmission electron microscopy (TEM). The micrographs were obtained from a molded sample prepared using formulation Example 1 with 22 wt % glass fiber. (Panel A) magnification at 2,000×, and it should be noted that the large circles edged with very dark marked indicated with "GF" represent cross section of glass fiber; (Panel B) magnification at 5,000×, and it should be noted that the large circles edged with very dark marked indicated with "GF" represent cross section of glass fiber; (Panel C) magnification at 10,000×; (Panel D) magnification at 25,000×; and (Panel E) shows annotation as indicated to the same sample as shown in Panel D. The data show microphase separation at the nanoscale in formulations either with or without glass fiber. For example, with reference to FIGS. 2d and 2e, the image shows a dispersed polycarbonate phase (deep grey dots) of about 50 nm The dielectric properties of representative disclosed blended thermoplastic compositions were also determined (see FIGS. 4 and 5). Dielectric constants (Dk) and dissipation factors (Df) were determined at the specified frequencies according to internal SABIC protocols such as using split post dielectric resonators methods known to one skilled in the art. The data show robust relative permittivity performance over a broad range of frequencies tested (see FIG. 6), with the representative formulations all have a Dk significantly lower than 4.00, and two representative formulations with a Dk of about 3.2. In contrast, Dk typically seen for PEEK with 30 wt % glass fiber is about 3.7 at 1 MHz; for PPA with 30 wt % glass fiber, the Dk is about 4.2 at 1 GHz; and for PAA with 30 wt % glass fiber, the Dk is about 4.6 at 110 Hz. The dissipation factor (Df) shows similar robust performance over the frequency range tested. The formulation identifiers in FIGS. 6 and 7 correspond to those described herein above. The formulation "USDA-0" is the USDA formulation without glass fiber.

Table 7 below shows various E-glass filled formulations compared with an S-glass filled formulation. Based on the epoxy functional group per gram, the amount of ERL-4221 can be converted from DER661 based on known calculations to achieve the same epoxy functional groups in the compounds.

TABLE 7

| Description | Example 5 | S10-1 | S10-2 | S10-3 | S10-4 |
|---|---|---|---|---|---|
| | Glass Type and Content | | | | |
| | 35% S-GF wt % | 20% E-GF wt % | 30% E-GF wt % | 45% E-GF wt % | 55% E-GF wt % |
| PBT resin LM | 40.6 | 47.3 | 42.2 | 34.6 | 26.1 |
| PC resin LM | 13 | 14 | 12 | 9 | 7 |
| s-glass | 35 | | | | |

TABLE 7-continued

| | Example 5 | S10-1 | S10-2 | S10-3 | S10-4 |
|---|---|---|---|---|---|
| | | | Glass Type and Content | | |
| Description | 35% S-GF wt % | 20% E-GF wt % | 30% E-GF wt % | 45% E-GF wt % | 55% E-GF wt % |
| E-glass | | 22 | 32 | 45 | 55 |
| Heat Stablizer (e.g., phosphite) | 0.15 | 0.15 | 0.15 | 0.15 | 0.15 |
| Antioxidant (e.g., hindered phenol) | 0.15 | 0.15 | 0.15 | 0.15 | 0.15 |
| transesterification quencher | 0.15 | 0.15 | 0.15 | 0.15 | 0.10 |
| Nuclear agent for PBT | 0.05 | 0.05 | 0.05 | 0.05 | 0.03 |
| Epoxy hydrostablizer | 0.4 | 0.4 | 0.4 | 0.4 | 0.3 |
| IM-1 + compatiblizer (e.g., HYTREL Polyester ether elastomer, 45% PTHF, 78/22 Tere/Iso split) | 3 | 3 | 3.0 | 3.0 | 1.9 |
| IM2 (e.g., Ethylene-EthylAcrylate Copolymer with EA below 20%) | 2.2 | 3.8 | 2.9 | 2.2 | 1.5 |
| IM3 combo with IM2 (e.g., PC 80%/ EMA-GMA 20% CONCENTRATE) | 5.3 | 9 | 7.0 | 5.3 | 4.0 |
| Total | 100 | 100 | 100 | 100 | 100 |

Table 8 below shows physical properties of various E-glass filled formulations (of Table 6) compared with an S-glass filled formulations.

TABLE 8

| Test Description | Unit | Example 5 | Example 3B | S10-1 | S10-2 | S10-3 | 510-4 |
|---|---|---|---|---|---|---|---|
| Glass type | — | S | S | E | E | E | E |
| Glass content | wt % | 35% | 45% | 20% | 30% | 45% | 55% |
| Specific gravity | | 1.50 | 1.59 | 1.38 | 1.47 | 1.61 | 1.70 |
| MFR, 5 kg, 285 C. (6370 at 250 C.) min | g/10 | 39 | 20 | 69 | 71 | 32 | 25 |
| Tensile Modulus | MPa | 12040 | 15260 | 7148 | 10060 | 14300 | 17660 |
| Tensile Strength at Yield | MPa | 170 | 187 | 122 | 146 | 165 | 159 |
| Tensile Elongation | % | 2.7 | 2.6 | 2.6 | 2.4 | 2.0 | 1.8 |
| Flex Modulus | MPa | 10800 | 13200 | 6670 | 9310 | 13200 | 16100 |
| Flex Strength | MPa | 247 | 257 | 190 | 220 | 250 | 249 |
| Notched Izod Impact strength | J/m | 158 | 170 | 125 | 143 | 150 | 160 |
| Unnotched Izod impact strength | J/m | 1130 | 1220 | 805 | 898 | 986 | 875 |

As show in Table 8, as compared to Example 5 and Example 3B, the samples with the comparable E-glass content have: higher melt flow index at about 285° C.; lower stiffness (tensile and flexural modulus); lower strength (tensile and flexural strength); and lower impact resistance (notched Izod impact strength and unnotched izod impact strength).

Figure 6:
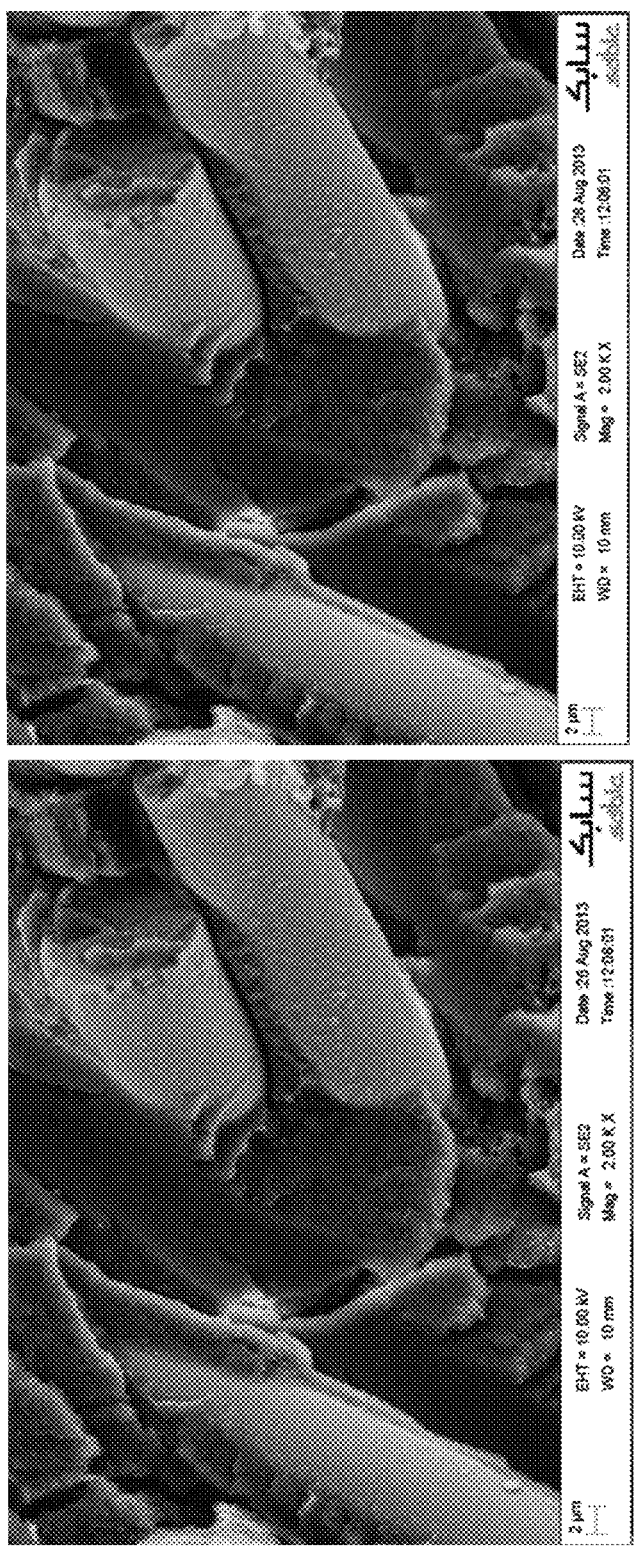
FIG. 6 shows SEM images.

FIG. 6 shows SEM images of S10-2 and -3. Both images demonstrate excellent glass adhesion from E-glass in the blends, similar to the samples containing S-glass.

Table 9 shows the mechanical property retention after stress cracking resistance (ESCR), such as ASTM D1693, test at room temperature with one day exposure in several strong oxidizing acids. The ASTM tensile bars were applied under both about 0% and about 0.5% strain after exposure to the listed chemicals for 24 hour. Then the bars were tested under ASTM D638 to measure tensile modulus of elasticity, tensile strength at break and tensile elongation at break. The retention was calculated in Table 9 by compared the tested data with the date from the control ASTM tensile bars without applying a chemical. Both samples containing E-glass and S-glass showed excellent retention (in the range of +/−10% difference).

TABLE 9

| Chemical | Retention | Unit | Example 5 | Example 3B | S10-1 | S10-2 | S10-3 | S10-4 |
|---|---|---|---|---|---|---|---|---|
| Acetic acid @ 0% strain | Tensile Modulus of Elasticity | % | 99 | 100 | 100 | 100 | 100 | 99 |
| | Tensile Strength at Break | % | 99 | 100 | 103 | 101 | 96 | 101 |
| | Tensile Elongation at Break | % | 99 | 100 | 100 | 100 | 97 | 105 |
| Acetic acid @ 0.5% strain | Tensile Modulus of Elasticity | % | 100 | 100 | 101 | 100 | 99 | 97 |
| | Tensile Strength at Break | % | 98 | 100 | 101 | 101 | 98 | 96 |
| | Tensile Elongation at Break | % | 100 | 102 | 100 | 98 | 96 | 104 |
| Up to 40% nitric acid @ 0% strain | Tensile Modulus of Elasticity | % | 100 | 100 | 101 | 101 | 100 | 98 |
| | Tensile Strength at Break | % | 100 | 101 | 103 | 102 | 98 | 99 |
| | Tensile Elongation at Break | % | 100 | 101 | 100 | 99 | 98 | 103 |

TABLE 9-continued

| Chemical | Retention | Unit | Example 5 | Example 3B | S10-1 | S10-2 | S10-3 | S10-4 |
|---|---|---|---|---|---|---|---|---|
| Up to 40% nitric acid @ 0.5% strain | Tensile Modulus of Elasticity | % | 100 | 98 | 101 | 99 | 99 | 97 |
| | Tensile Strength at Break | % | 99 | 101 | 100 | 99 | 98 | 100 |
| | Tensile Elongation at Break | % | 97 | 104 | 100 | 100 | 100 | 105 |
| Up to 75% sulfuric acid @ 0% strain | Tensile Modulus of Elasticity | % | 99 | 100 | 100 | 100 | 100 | 100 |
| | Tensile Strength at Break | % | 99 | 99 | 103 | 102 | 99 | 99 |
| | Tensile Elongation at Break | % | 96 | 101 | 101 | 99 | 100 | 102 |
| Up to 75% sulfuric acid @ 0.5% strain | Tensile Modulus of Elasticity | % | 100 | 99 | 100 | 100 | 98 | 97 |
| | Tensile Strength at Break | % | 99 | 101 | 103 | 101 | 98 | 97 |
| | Tensile Elongation at Break | % | 95 | 102 | 100 | 99 | 96 | 99 |

Figure 7:
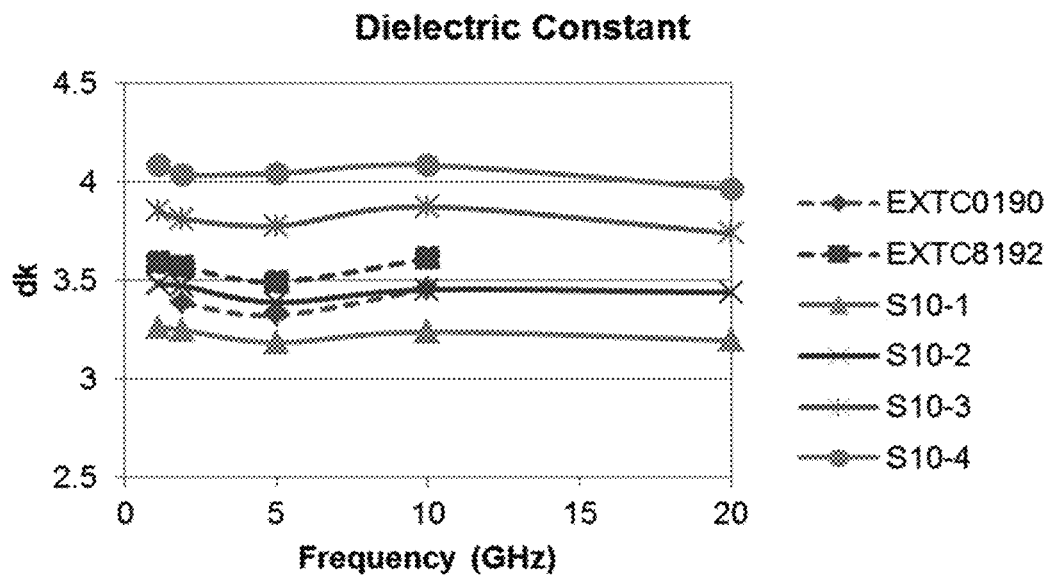
FIGS. 7 and 8 show the dielectric properties of representative disclosed blended thermoplastic compositions.
Figure 8:
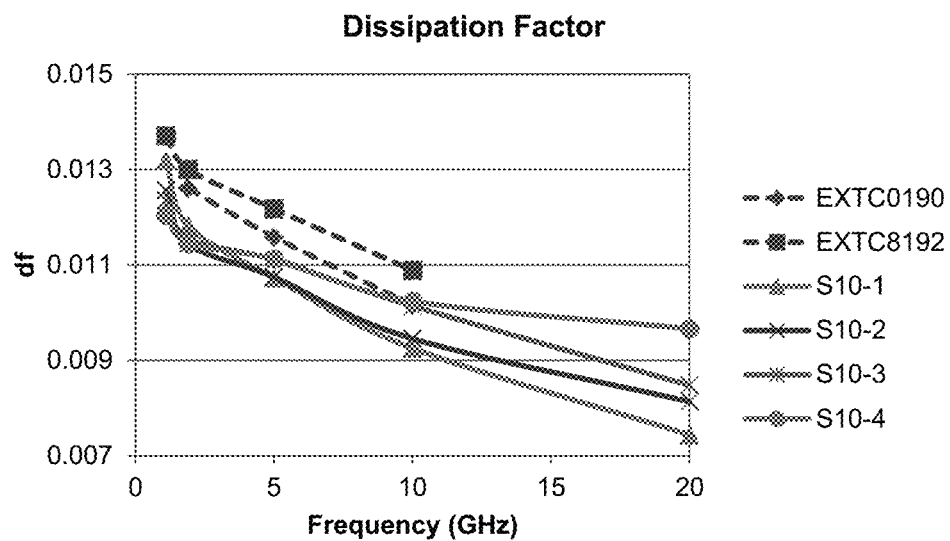

FIGS. 7 and 8 shows the dielectric properties of representative disclosed blended thermoplastic compositions. Dielectric constants (Dk) and dissipation factors (Df) were determined at the specified frequencies according to SABIC protocols such as split post dielectric resonators methods. Fore example, the test method can be configured to determine the complex permittivity of laminar dielectric materials utilizing network analyser with split post dielectric resonators. Permittivity and dissipation at frequency of 1.1/1.9/5/10/20 GHz were measured. The more glass content, the higher Dk. S10-3 has higher Dk, compared with Example 2, which also contains 45% but S-glass. It is suggested S-glass might provide slightly lower Dk in the blends.

Table 10 shows the comparison of E-glass in PBT/PC resins with S-glass in PBT/PC resins, wherein "+" indicates higher or better, "−" indicates lower or worse, and "O" indicates similar).

TABLE 10

| | E-GF in compound | S-GF in compound |
|---|---|---|
| Flow | + | − |
| Impact | − | + |
| Strength | − | + |
| Elongation | − | + |
| Crystallinity | O | O |
| Colorability | O | O |
| UV | O | O |
| ESCR | O | O |
| Dielectric constant | − | + |

As the data suggest, the inventive formulations exhibit the ideal combination of white colorability, mechanical properties and chemical resistance. Indeed, the data suggests that the inventive formulations are the only white colorable, ultra stiff, high impact strength solution that is also chemically resistant to strong acids and cosmetic chemicals. Chemically resistant, as used herein, can mean resitant to oxidizing acids at high concentrations.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blended thermoplastic composition comprising:
   a) from about 5 wt % to about 25 wt % of a polycarbonate component;
   b) from about 20 wt % to about 55 wt % of a polybutylene terephthalate component;
   c) from about 0.1 wt % to about 5 wt % of a polyester compatibilizer component;
   d) from about 0.1 wt % to about 5 wt % of an acrylic impact modifier component;
   e) from about 0.1 wt % to about 3 wt % of an ethylene/alkyl acrylate/glycidyl methacrylate terpolymer compatibilizer component; and
   f) from about 10 wt % to about 60 wt % of a glass fiber component;
   wherein the wt % ratio of the polycarbonate component to polybutylene terephthalate component is less than or equal to about 0.5;
   wherein the blended thermoplastic composition is chemically resistant;
   wherein the combined weight percent value of all components does not exceed about 100 wt %; and
   wherein all weight percent values are based on the total weight of the composition.

2. The composition of claim 1, wherein the polycarbonate component is a homopolymer comprising repeating unites derived from bisphenol A.

3. The composition of claim 1, wherein the polycarbonate component is a polycarbonate copolymer comprising repeating units derived from bisphenol A or sebacic acid, or both.

4. The composition of claim 1, wherein the polycarbonate component has a weight average molecular weight from about 15,000 to about 50,000 grams/mole, as measured by gel permeation chromatography using BPA polycarbonate standards.

5. The composition of claim 1, wherein the polycarbonate component has a melt volume flow rate (MVR) from about 17 grams/10 minutes to about 32 grams/10 minutes when measured at 300° C. and under a load of 1.2 kg according to ASTM D1238.

6. The composition of claim 1, wherein the polybutylene terephthalate component has an intrinsic viscosity from about 0.50 to about 0.80.

7. The composition of claim 1, wherein the glass fiber component is present in an amount from about 20 wt % to about 55 wt %.

8. The composition of claim 1, wherein the glass fiber component is present in an amount from about 25 wt % to about 60 wt %.

9. The composition of claim 1, wherein the glass fiber component is present in an amount from about 30 wt % to about 57 wt %.

10. The composition of claim 1, wherein the glass fiber component is present in an amount from about 43 wt % to about 57 wt %.

11. The composition of claim 1, wherein the glass fiber is selected from an E-glass, an S-glass, and combinations thereof.

12. The composition of claim 1, wherein the glass fiber is one or more S-glass materials.

13. The composition of claim 1, wherein the glass fiber is one or more E-glass materials.

14. The composition of claim 1, wherein the glass fiber is chopped.

15. The composition of claim 1, wherein the glass fiber has a length from about 0.2 mm to about 20 mm.

16. The composition of claim 1, wherein the glass fiber has a circular cross-sectional area.

17. The composition of claim 1, wherein the glass fiber has a diameter from about 1 μm to about 35 μm.

18. The composition of claim 1, further comprising a transesterification quenching agent.

19. The composition of claim 18, wherein the transesterification quenching agent is selected from an acidic phosphate salt, a Group IB phosphate salt, a Group IIB phosphate salt, a phosphorus oxo-acid, and mixtures thereof.

20. The composition of claim 18, wherein the transesterification quenching agent is present in an amount from greater than about 0 wt % to about 1 wt %.

21. The composition of claim 1, further comprising an epoxy hydrostabilizer agent.

22. The composition of claim 21, wherein the epoxy hydrostabilizer agent is an oligomeric epoxide.

23. The composition of claim 21, wherein the epoxy hydrostabilizer agent has an epoxide equivalent weight from about 400 g/eq to about 2000 g/eq.

24. The composition of claim 1, further comprising an additive comprising an antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

25. The composition of claim 1, wherein a molded sample of the blended thermoplastic composition has notched Izod impact strength greater than or equal to about 140 J/m when determined in accordance with ASTM D256.

26. The composition of claim 1, wherein a molded sample of the blended thermoplastic composition has notched Izod impact strength greater than or equal to about 150 J/m when determined in accordance with ASTM D256.

27. The composition of claim 1, wherein a molded sample of the blended thermoplastic composition has a dielectric constant less than or equal to about 4.0.

28. An article comprising a composition of claim 1.

29. The article of claim 28, wherein the article is extrusion molded or injection molded.

30. The article of claim 28, wherein the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device and RFID device.

31. A chemically resistant blended thermoplastic composition comprising:
a) from about 5 wt % to about 25 wt % of a polycarbonate component;
b) from about 20 wt % to about 55 wt % of a polybutylene terephthalate component;
c) from about 0.1 wt % to about 5 wt % of a polyester compatibilizer component;
d) from about 0.1 wt % to about 5 wt % of an acrylic impact modifier component;
e) from about 0.1 wt % to about 3 wt % of an ethylene/alkyl acrylate/glycidyl methacrylate terpolymer compatibilizer component; and
f) from about 10 wt % to about 60 wt % of a glass fiber component;
wherein the wt % ratio of the polycarbonate component to polybutylene terephthalate component is less than or equal to about 0.5;
wherein the combined weight percent value of all components does not exceed about 100 wt %;
wherein all weight percent values are based on the total weight of the composition;
wherein a molded sample of the blended thermoplastic composition has notched Izod impact strength greater than or equal to about 140 J/m when determined in accordance with ASTM D256; and
wherein a molded sample of the blended thermoplastic composition has a dielectric constant less than or equal to about 4.0.

32. A method of improving the impact strength and dielectric constant of a blended thermoplastic composition, the method comprising the step of combining;
a) from about 5 wt % to about 25 wt % of a polycarbonate component;
b) from about 20 wt % to about 55 wt % of a polybutylene terephthalate component;
c) from about 0.1 wt % to about 5 wt % of a polyester compatibilizer component;
d) from about 0.1 wt % to about 5 wt % of an acrylic impact modifier component;
e) from about 0.1 wt % to about 3 wt % of a polycarbonate an ethylene/alkyl acrylate/glycidyl methacrylate terpolymer compatibilizer component; and
f) from about 10 wt % to about 60 wt % of a glass fiber component;
wherein the wt % ratio of the polycarbonate component to polybutylene terephthalate component is less than or equal to about 0.5;
wherein the combined weight percent value of all components does not exceed about 100 wt %;
wherein all weight percent values are based on the total weight of the composition.

33. A chemically resistant blended thermoplastic composition comprising:
a) from about 5 wt % to about 25 wt % of a polycarbonate component;
b) from about 20 wt % to about 55 wt % of a polybutylene terephthalate component;
c) from about 0.1 wt % to about 5 wt % of a polyester compatibilizer component;
d) from about 0.1 wt % to about 5 wt % of an acrylic impact modifier component;
e) from about 0.1 wt % to about 3 wt % of an ethylene/alkyl acrylate/glycidyl methacrylate terpolymer compatibilizer component; and
f) from about 10 wt % to about 40 wt % of a glass fiber component;
wherein the wt % ratio of the polycarbonate component to polybutylene terephthalate component is less than or equal to about 0.5;
wherein the combined weight percent value of all components does not exceed about 100 wt %;

wherein a molded sample of the blended thermoplastic composition has a dielectric constant less than or equal to about 3.5 when tested in accordance with ASTM D2520.

* * * * *